(12) United States Patent
Jay

(10) Patent No.: US 11,561,569 B2
(45) Date of Patent: Jan. 24, 2023

(54) RECIPROCATING PEDALS WITH DUAL-LEVERED CAM FOR ASYMMETRIC RECIPROCATION

(71) Applicant: Hyster-Yale Group, Inc., Fairview, OR (US)

(72) Inventor: Anthony Michael Jay, Salem, OR (US)

(73) Assignee: Hyster-Yale Group, Inc., Fairview, OR (US)

(*) Notice: Subject to any disclaimer, the term of this patent is extended or adjusted under 35 U.S.C. 154(b) by 0 days.

(21) Appl. No.: 17/526,110

(22) Filed: Nov. 15, 2021

(65) Prior Publication Data

US 2022/0100382 A1 Mar. 31, 2022

Related U.S. Application Data

(62) Division of application No. 16/424,297, filed on May 28, 2019, now Pat. No. 11,175,688.

(51) Int. Cl.
| | |
|---|---|
| *G05G 11/00* | (2006.01) |
| *B66F 9/075* | (2006.01) |
| *F16H 25/18* | (2006.01) |
| *F16H 53/02* | (2006.01) |
| *G06F 3/06* | (2006.01) |

(52) U.S. Cl.
CPC ............ *G05G 11/00* (2013.01); *B66F 9/0759* (2013.01); *F16H 25/18* (2013.01); *F16H 53/025* (2013.01); *G06F 3/0604* (2013.01); *G06F 3/064* (2013.01); *G06F 3/065* (2013.01); *G06F 3/067* (2013.01)

(58) Field of Classification Search
CPC ....... G05G 11/00; B66F 9/0759; F16H 25/18; F16H 53/025
See application file for complete search history.

(56) References Cited

U.S. PATENT DOCUMENTS

| | | | | |
|---|---|---|---|---|
| 4,129,047 | A * | 12/1978 | Doman | G05G 1/36 74/478 |
| 5,022,477 | A * | 6/1991 | Wanie | B60K 20/00 180/6.34 |
| 6,347,560 | B1 * | 2/2002 | Maezawa | G05G 11/00 74/473.16 |
| 2015/0107394 | A1 * | 4/2015 | Goto | G05G 1/36 74/479.01 |
| 2015/0260283 | A1 * | 9/2015 | Iida | F16H 59/06 74/473.17 |

* cited by examiner

*Primary Examiner* — Zakaria Elahmadi
(74) *Attorney, Agent, or Firm* — Laurence & Phillips IP Law

(57) ABSTRACT

A lift truck employs forward and reverse pedals connected through respective cams having different upper and lower cam profiles that engage to provide asymmetric reciprocal pedal motion. For example, first pedal depression causes a first cam upper profile to engage with a second cam upper profile and cause increased elevation of a second pedal, and first pedal depression causes a first cam lower profile to disengage with a second cam lower profile associated with the second pedal, such that first pedal depression is greater than the increased elevation of the second pedal.

24 Claims, 24 Drawing Sheets

RECIPROCATING PEDALS WITH DUAL-LEVERED CAM FOR ASYMMETRIC RECIPROCATION

CROSS REFERENCE TO RELATED APPLICATION

This application is a divisional of U.S. patent application Ser. No. 16/424,297, entitled "Reciprocating Pedals with Dual-Levered Cam for Asymmetric Reciprocation," filed May 28, 2019, now U.S. Pat. No. 11,175,688, granted Nov. 16, 2021. The entire disclosure of that patent application is incorporated by reference herein.

TECHNICAL FIELD

The field of this disclosure relates generally to material-handling vehicles. More specifically, this disclosure relates to lift trucks having asymmetrically reciprocating control pedals (e.g., forward and reverse pedals).

BACKGROUND INFORMATION

Material-handling trucks, including, for example, lift trucks (such as forklifts), boom trucks, and container-handling trucks, are commonly used in manufacturing and warehousing facilities to lift and to transport materials. For convenience, material-handling trucks are presented herein only by way of example to lift trucks. Lift trucks typically have a small turning radius and compact footprint, and they are able to repeatedly lift thousands of pounds of materials with little maintenance. An operator controls the lift truck from an operator compartment, which may include various controls, such as a steering wheel or seat-side steering controls, other hand controls, and/or foot controls. Typical foot controls include acceleration pedals and a brake pedal.

Lift trucks with reciprocating forward and backward acceleration pedals are known. Depression of one such pedal will cause (in addition to the desired acceleration in either the forward or backward direction) the other pedal to rise, and vice versa. It is known to have such forward and backward acceleration pedals that reciprocate symmetrically—i.e., depression of one pedal a given distance causes the other pedal to rise the same distance.

Asymmetrically reciprocating forward and backward control pedals in vehicles are also known. U.S. Pat. No. 4,215,547 discloses a dual-pedal design in which downward movement of one pedal in the pair in a given distance causes upward motion of the other pedal by a fraction of the given distance. However, the mechanism in that patent is complicated.

Overview of Disclosure

One aspect of this disclosure relates to asymmetrically reciprocating forward and backward pedals that utilize a dual-levered cam.

Another aspect of this disclosure relates to asymmetrically reciprocating forward and backward acceleration pedals in a lift truck, in which the asymmetrical reciprocating action is obtained utilizing a dual-levered cam.

The cams work by creating different distant cam lever arms from their respective rotational pins (or axes of rotation). By having a shorter cam distance to the rotational pin (or axis of rotation) for the downward moving pedal and a longer one on the upward moving pedal, the cam allows the travel of the pedal moving down to be moved further than the one moving up. The cam profile is defined to engage and allow for movement through a specific rotational range and then disengage as the other cam engages to allow the other cam to control the movement. In this respect, the cam profile may be said to operate in a similar fashion as a gear.

In some embodiments, a dual cam device comprises a first cam and a second cam. The first cam is operatively connected to the first pedal such that movement of the first pedal causes movement of the first cam about a first rotational axis and such that movement of the first cam about the first rotational axis causes movement of the first pedal, wherein the first cam has a first cam profile having a first cam upper profile and a first cam lower profile that are different. The second cam is operatively connected to the second pedal such that movement of the second pedal causes movement of the second cam about a second rotational axis and such that movement of the second cam about the second rotational axis causes movement of the second pedal, wherein the second cam has a second cam profile having a second cam upper profile and a second cam lower profile that are different. The first cam and the second cam are positioned relative to each other such that the first cam profile and the second cam profile face each other in a generally mating arrangement such that one or more first cam upper points of the first cam upper profile that contact one or more second cam upper points of the second cam upper profile have respective first cam shorter distances to the first rotational axis, and one or more second upper cam points of the second cam upper profile that contact one or more first cam upper points of the first cam upper profile have respective second cam longer distances to the second rotational axis. The second cam longer distances are greater than the first cam shorter distances, and wherein contact between the one or more first cam upper points with the one or more second cam upper points during rotation of the first cam about the first rotational axis in a first cam first rotational direction causes the second cam to rotate to a lesser amount about the second rotational axis in a second cam second rotational direction that is opposite to the first cam first rotational direction. One or more first cam lower points of the first cam lower profile that contact one or more second cam lower points of the second cam lower profile have respective first lower cam longer distances to the first rotational axis, and one or more second lower cam points of the second cam lower profile that contact one or more first cam lower points of the first cam lower profile have respective second cam shorter distances to the second rotational axis. The second cam shorter distances are less than the first cam longer distances. Contact between the one or more second cam lower points with the one or more first cam lower points during rotation of the second cam about the second rotational axis in a second cam first rotational direction causes the first cam to rotate to a lesser amount about the first rotational axis in a first cam second rotational direction that is opposite to the second cam first rotational direction.

In some additional, alternative, or selectively cumulative embodiments, a pedal control mechanism for movement associated with a vehicle comprises a first pedal operatively connected for causing movement of the vehicle in first vehicle direction; a second pedal operatively connected for causing movement of the vehicle in a second vehicle direction; a first cam configured for movement and operatively connected to the first pedal in a manner such that movement of the first pedal causes movement of the first cam and such that movement of the first cam causes movement of the first pedal, wherein the first cam has a side having a first cam profile comprising a first cam upper profile and a first cam lower profile that are different; a second cam configured for movement and operatively connected to the second pedal in a manner such that movement of the second pedal causes movement of the second cam and such that movement of the second cam causes movement of the second pedal, wherein the second cam has a side having a second cam profile comprising a second cam upper profile and a second cam lower profile that are different; and wherein the first cam and the second cam are positioned relative to each other such that the first cam profile and the second cam profile face each other in a generally mating arrangement such that: movement of the first pedal in a first pedal first direction causes the first cam upper profile to move and engage with the second cam upper profile and cause it to move the second pedal in a second pedal second direction, and movement of the first pedal in a first pedal first direction causes the first cam lower profile to disengage with the second cam lower profile associated with the second pedal, such that movement of the first pedal in the first pedal first direction is greater than the movement of the second pedal in the second pedal second direction; and movement of the second pedal in a second pedal first direction causes the second cam lower profile to move and engage with the first cam lower profile and cause it to move the first pedal in a first pedal second direction, and movement of the second pedal in a second pedal first direction causes the second cam upper profile to disengage with the first cam upper profile associated with the first pedal, such that movement of the second pedal in the second pedal first direction is greater than the movement of the first pedal in the first pedal second direction.

In some additional, alternative, or selectively cumulative embodiments, a pedal control mechanism for movement associated with a vehicle comprises a first pedal operatively connected for causing movement of the vehicle in a first vehicle direction; a second pedal operatively connected for causing movement of the vehicle in a second vehicle direction; a first cam operatively directly or indirectly connected to the first pedal in a manner, such that movement of the first pedal causes movement of the first cam and such that movement of the first cam causes movement of the first pedal, wherein the first cam has a first cam profile having a first cam upper profile and a first cam lower profile that are different; a second cam operatively directly or indirectly connected to the second pedal in a manner, such that movement of the second pedal causes movement of the second cam and such that movement of the second cam causes movement of the second pedal, wherein the second cam has a second cam profile having a second cam upper profile and a second cam lower profile that are different; and a cam proximity between the first cam and the second cam, such that: movement of the first pedal in a first pedal first direction causes the first cam upper profile to move and engage with the second cam upper profile and cause it to move the second pedal in a second pedal second direction, and movement of the first pedal in a first pedal first direction causes the first cam lower profile to disengage with the second cam lower profile associated with the second pedal, such that movement of the first pedal in the first pedal first direction is greater than the movement of the second pedal in the second pedal second direction; and movement of the second pedal in a second pedal first direction causes the second cam lower profile to move and engage with the first cam lower profile and cause it to move the first pedal in a first pedal second direction, and movement of the second pedal in a second pedal first direction causes the second cam upper profile to disengage with the first cam upper profile associated with the first pedal, such that movement of the second pedal in the second pedal first direction is greater than the movement of the first pedal in the first pedal second direction.

In some additional, alternative, or selectively cumulative embodiments, a pedal control mechanism for movement associated with a vehicle comprises a first pedal operatively connected for causing movement of the vehicle in first vehicle direction; a second pedal operatively connected for causing movement of the vehicle in a second vehicle direction; a first cam configured for movement about a first rotational axis and operatively connected to the first pedal in a manner such that movement of the first pedal causes movement of the first cam about the first rotational axis and such that movement of the first cam about the first rotational axis causes movement of the first pedal, wherein the first cam has a side having a first cam profile comprising a first cam upper profile and a first cam lower profile that are different; a second cam configured for movement about a second rotational axis and operatively connected to the second pedal in a manner such that movement of the second pedal causes movement of the second cam about the second rotational axis and such that movement of the second cam about the second rotational axis causes movement of the second pedal, wherein the second cam has a side having a second cam profile comprising a second cam upper profile and a second cam lower profile that are different; and wherein the first cam and the second cam are positioned relative to each other such that the first cam profile and the second cam profile face each other in a generally mating arrangement such that: one or more first cam upper points of the first cam upper profile that contact one or more second cam upper points of the second cam upper profile have respective first cam shorter distances to the first rotational axis, and one or more second upper cam points of the second cam upper profile that contact one or more first cam upper points of the first cam upper profile have respective second cam longer distances to the second rotational axis, wherein the second cam longer distances are longer than the first cam shorter distances, and wherein contact between the one or more first cam upper points with the one or more second cam upper points during rotation of the first upper cam about the first rotational axis in a first cam first rotational direction causes the second cam to rotate to a lesser amount about the second rotational axis in a second cam second rotational direction that is opposite to the first cam first rotational direction; and one or more first cam lower points of the first cam lower profile that contact one or more second cam lower points of the second cam lower profile have respective first lower cam longer distances to the first rotational axis, and one or more second lower cam points of the second cam lower profile that contact one or more first cam lower points of the first cam lower profile have respective second cam shorter distances to the second rotational axis, wherein the second cam shorter distances are shorter than the first cam longer distances, and wherein contact between the one or more second cam lower points with the one or more first cam lower points during rotation of the second cam about the second rotational axis in a second cam first rotational direction causes the first cam to rotate to a lesser amount about the first rotational axis in a first cam second rotational direction that is opposite to the second cam first rotational direction.

In some additional, alternative, or selectively cumulative embodiments, a vehicle comprises a drive wheel; a steer wheel; a chassis operatively connected to the drive wheel and the steer wheel; a drive source operatively connected to the drive wheel and the chassis; a first pedal operatively connected to the drive wheel for causing movement of the vehicle in a first vehicle direction; a second pedal operatively connected to the drive wheel for causing movement of the vehicle in a second vehicle direction; a first cam operatively connected to the first pedal such that movement of the first pedal causes movement of the first cam about a first rotational axis and such that movement of the first cam about the first rotational axis causes movement of the first pedal, wherein the first cam has a first cam profile having a first cam upper profile and a first cam lower profile that are different; and a second cam operatively connected to the second pedal such that movement of the second pedal causes movement of the second cam about a second rotational axis and such that movement of the second cam about the second rotational axis causes movement of the second pedal, wherein the second cam has a second cam profile having a second cam upper profile and a second cam lower profile that are different; wherein the first cam and the second cam are positioned relative to each other such that the first cam profile and the second cam profile face each other in a generally mating arrangement such that: one or more first cam upper points of the first cam upper profile that contact one or more second cam upper points of the second cam upper profile have respective first cam shorter distances to the first rotational axis, and one or more second upper cam points of the second cam upper profile that contact one or more first cam upper points of the first cam upper profile have respective second cam greater distances to the second rotational axis, wherein the second cam longer distances are longer than the first cam shorter distances, and wherein contact between the one or more first cam upper points with the one or more second cam upper points during rotation of the first upper cam about the first rotational axis in a first cam first rotational direction causes the second cam to rotate to a lesser amount about the second rotational axis in a second cam second rotational direction that is opposite to the first cam first rotational direction; and one or more first cam lower points of the first cam lower profile that contact one or more second cam lower points of the second cam lower profile have respective first lower cam longer distances to the first rotational axis, and one or more second lower cam points of the second cam lower profile that contact one or more first cam lower points of the first cam lower profile have respective second cam shorter distances to the second rotational axis, wherein the second cam shorter distances are less than the first cam longer distances, and wherein contact between the one or more second cam lower points with the one or more first cam lower points during rotation of the second cam about the second rotational axis in a second cam first rotational direction causes the first cam to rotate to a lesser amount about the first rotational axis in a first cam second rotational direction that is opposite to the second cam first rotational direction.

In some additional, alternative, or selectively cumulative embodiments, a lift truck comprises a drive wheel; a steer wheel; a chassis operatively connected to the drive wheel and the steer wheel; a drive source operatively connected to the drive wheel and the chassis; a mast operatively connected to the lift truck; an attachment operatively connected to the mast and configured to lift and carry a load; a first pedal operatively connected to the drive wheel for causing movement of the vehicle in a first vehicle direction; a second pedal operatively connected to the drive wheel for causing movement of the vehicle in a second vehicle direction; a first cam operatively connected to the first pedal such that movement of the first pedal causes movement of the first cam about a first rotational axis and such that movement of the first cam about the first rotational axis causes movement of the first pedal, wherein the first cam has a first cam profile having a first cam upper profile and a first cam lower profile that are different; and a second cam operatively connected to the second pedal such that movement of the second pedal causes movement of the second cam about a second rotational axis and such that movement of the second cam about the second rotational axis causes movement of the second pedal, wherein the second cam has a second cam profile having a second cam upper profile and a second cam lower profile that are different; wherein the first cam and the second cam are positioned relative to each other such that the first cam profile and the second cam profile face each other in a generally mating arrangement such that: one or more first cam upper points of the first cam upper profile that contact one or more second cam upper points of the second cam upper profile have respective first cam shorter distances to the first rotational axis, and one or more second upper cam points of the second cam upper profile that contact one or more first cam upper points of the first cam upper profile have respective second cam greater distances to the second rotational axis, wherein the second cam longer distances are longer than the first cam shorter distances, and wherein contact between the one or more first cam upper points with the one or more second cam upper points during rotation of the first upper cam about the first rotational axis in a first cam first rotational direction causes the second cam to rotate to a lesser amount about the second rotational axis in a second cam second rotational direction that is opposite to the first cam first rotational direction; and one or more first cam lower points of the first cam lower profile that contact one or more second cam lower points of the second cam lower profile have respective first lower cam longer distances to the first rotational axis, and one or more second lower cam points of the second cam lower profile that contact one or more first cam lower points of the first cam lower profile have respective second cam shorter distances to the second rotational axis, wherein the second cam shorter distances are less than the first cam longer distances, and wherein contact between the one or more second cam lower points with the one or more first cam lower points during rotation of the second cam about the second rotational axis in a second cam first rotational direction causes the first cam to rotate to a lesser amount about the first rotational axis in a first cam second rotational direction that is opposite to the second cam first rotational direction.

In some additional, alternative, or selectively cumulative embodiments, a lift truck comprises drive wheels; a load wheel; a chassis operatively directly or indirectly connected to the drive wheels and the load wheel; a drive source operatively directly or indirectly connected to the drive wheels and the chassis; a mast operatively directly or indirectly connected to the chassis; forks operatively directly or indirectly connected to the mast; a first pedal operatively connected to the drive wheels for causing movement of the vehicle in first vehicle direction; a second pedal operatively connected to the drive wheels for causing movement of the vehicle in a second vehicle direction; a first cam operatively directly or indirectly connected to the first pedal in a manner, such that movement of the first pedal causes movement of the first cam about first pin and such that movement of the first cam about the first pin causes movement of the first pedal, wherein the first cam has a first cam profile having a first cam upper profile and a first cam lower profile that are different; a second cam operatively directly or indirectly connected to the second pedal in a manner, such that movement of the second pedal causes movement of the second cam about a second pin and such that movement of the second cam about the second pin causes movement of the second pedal, wherein the second cam has a second cam profile having a second cam upper profile and a second cam lower profile that are different; and a cam proximity between the first cam and the second cam, such that: movement of the first pedal in a first pedal first direction causes the first cam upper profile to move about the first pin and engage with the second cam upper profile and cause it to move about the second pin to cause movement of the second pedal in a second pedal second direction, and movement of the first pedal in a first pedal first direction causes the first cam lower profile to disengage with the second cam lower profile associated with the second pedal, such that movement of the first pedal in the first pedal first direction is greater than the movement of the second pedal in the second pedal second direction; and movement of the second pedal in a second pedal first direction causes the second cam lower profile to move about the second pin and engage with the first cam lower profile and cause it to move about the first pin to cause movement of the first pedal in a first pedal second direction, and movement of the second pedal in a second pedal first direction causes the second cam upper profile to disengage with the first cam upper profile associated with the first pedal, such that movement of the second pedal in the second pedal first direction is greater than the movement of the first pedal in the first pedal second direction.

In some additional, alternative, or selectively cumulative embodiments, a method imparts asymmetric movement to associated first and second pedals adapted for operative connection to a drive wheel of a vehicle. The method involves a first cam having a first cam profile having a first cam upper profile and a first cam lower profile that are different. The method also involves a second cam having a second cam profile having a second cam upper profile and a second cam lower profile that are different. The method comprises, in response to downward movement of the first pedal, moving a first cam about a first rotational axis, thereby causing rotation of the first upper cam profile about the first rotational axis; during rotation of the first upper cam profile about the first rotational axis in a first cam first rotational direction, contacting one or more first cam upper points with one or more second cam upper points; and causing, as a result of the contacting, the second cam to rotate to a lesser amount about the second rotational axis in a second cam second rotational direction that is opposite to the first cam first rotational direction. The method also comprises, in response to downward movement of the second pedal, moving a second cam about a second rotational axis, thereby causing rotation of the second lower cam profile about the second rotational axis; during rotation of the second lower cam profile about the second rotational axis in a second cam first rotational direction, contacting one or more second cam lower points with one or more first cam lower points; and causing, as a result of the contacting, the first cam to rotate to a lesser amount about the first rotational axis in a first cam second rotational direction that is opposite to the second cam first rotational direction.

In some additional, alternative, or selectively cumulative embodiments, a method for moving a vehicle having a drive source comprises powering the drive source; and pressing, in a first pedal first direction, a first pedal operatively connected indirectly to the drive source for causing movement of the vehicle in first vehicle direction in response to pressing the first pedal in the first pedal first direction, wherein: the first pedal is directly or indirectly operatively connected to a first cam in a manner such that movement of the first pedal in the first pedal first direction causes movement of the first cam about a first pin in a first cam first direction and such that movement of the first cam in a first cam second direction causes movement of the first pedal in a first pedal second direction that is opposite to the first pedal first direction; the first cam has a first cam profile having a first cam upper profile and a first cam lower profile that are different; movement of the first cam about the first pin causes movement of a second cam about a second pin in second cam second direction that is opposite to the first cam first direction; the second cam is operatively directly or indirectly connected to a second pedal that is operatively connected indirectly to the drive source for causing movement of the vehicle in a second vehicle direction that is opposite to the first vehicle direction in response to pressing the second pedal in the second pedal first direction such that movement of the second pedal in the second pedal first direction causes movement of the second cam about the second pin in a second cam first direction and such that movement of the second cam in a second cam second direction causes movement of the second pedal in a second pedal second direction that is opposite to the second pedal first direction; the second cam has a second cam profile having a second cam upper profile and a second cam lower profile that are different; and there is a cam proximity between the first cam and the second cam, such that: movement of the first pedal in the first pedal first direction causes the first cam upper profile to move about the first pin and engage with the second cam upper profile and cause it to move about the second pin to cause movement of the second pedal in the second pedal second direction, and movement of the first pedal in the first pedal first direction causes the first cam lower profile to disengage with the second cam lower profile associated with the second pedal, such that movement of the first pedal in the first pedal first direction is greater than the movement of the second pedal in the second pedal second direction; and movement of the second pedal in the second pedal first direction causes the second cam lower profile to move about the second pin and engage with the first cam lower profile and cause it to move about the first pin to cause movement of the first pedal in the first pedal second direction, and movement of the second pedal in the second pedal first direction causes the second cam upper profile to disengage with the first cam upper profile associated with the first pedal, such that movement of the second pedal in the second pedal first direction is greater than the movement of the first pedal in the first pedal second direction.

In some additional, alternative, or selectively cumulative embodiments, the vehicle is a material-handling truck.

In some additional, alternative, or selectively cumulative embodiments, the first cam upper profile and the first cam lower profile are asymmetric.

In some additional, alternative, or selectively cumulative embodiments, the second cam upper profile and the second cam lower profile are asymmetric.

In some additional, alternative, or selectively cumulative embodiments, the first cam and the second cam have a generally mating asymmetric S-shape profiles.

In some additional, alternative, or selectively cumulative embodiments, the first cam profile and the second cam profile are different from each other regardless of orientation.

In some additional, alternative, or selectively cumulative embodiments, the first cam upper profile comprises a first cam upper profile peak, wherein the first cam lower profile comprises a first cam lower profile peak, and wherein the first cam upper profile peak is different from the first cam lower profile peak.

In some additional, alternative, or selectively cumulative embodiments, the second cam upper profile comprises a second cam upper profile peak, wherein the second cam lower profile comprises a second cam lower profile peak, and wherein the second cam upper profile peak is different from the second cam lower profile peak.

In some additional, alternative, or selectively cumulative embodiments, the first cam upper profile comprises a first cam upper profile peak, wherein the first cam lower profile comprises a first cam lower profile peak, wherein the second cam upper profile comprises a second cam upper profile peak, wherein the second cam lower profile comprises a second cam lower profile peak, and wherein the first cam upper profile peak is different from the first cam lower profile peak, the second cam upper profile peak, and the second cam lower profile peak.

In some additional, alternative, or selectively cumulative embodiments, the first cam upper profile comprises a first cam upper profile peak; wherein the first cam lower profile comprises a first cam lower profile peak, wherein the second cam upper profile comprises a second cam upper profile peak; wherein the second cam lower profile comprises a second cam lower profile peak; wherein the first cam upper profile peak is different from the first cam lower profile peak, the second cam upper profile peak, and the second cam lower profile peak; and wherein the second cam upper profile peak is different from the second cam lower profile peak, and the first cam lower profile peak.

In some additional, alternative, or selectively cumulative embodiments, the first cam upper profile comprises a first cam upper profile peak and a first cam upper trough, wherein the first cam lower profile comprises a first cam lower profile peak, and wherein the first cam upper profile peak is shorter than the first cam lower profile peak.

In some additional, alternative, or selectively cumulative embodiments, the first cam upper profile comprises a first cam upper profile peak, wherein the first cam lower profile comprises a first cam lower profile peak, wherein the first cam upper profile peak is shorter than the first cam lower profile peak, wherein the first cam upper profile peak is adapted to guide downward movement of the first pedal in response to downward movement of the first pedal, and wherein the first cam lower profile peak is adapted to guide upward movement of the first pedal in response to downward movement of the second pedal.

In some additional, alternative, or selectively cumulative embodiments, the second cam lower profile comprises a second cam lower profile peak, wherein the second cam upper profile comprises a second cam upper profile peak, wherein the second cam lower profile peak is shorter than the second cam upper profile peak, wherein the second cam lower profile peak is adapted to guide downward movement of the second pedal in response to downward movement of the second pedal, and wherein the second cam upper profile peak is adapted to guide upward movement of the second pedal in response to downward movement of the first pedal.

In some additional, alternative, or selectively cumulative embodiments, the differences between the peaks comprise differences in a distance of a peak with respect to its associated axis of rotation.

In some additional, alternative, or selectively cumulative embodiments, the first cam lower profile comprises a first cam lower trough, wherein the first cam upper trough is deeper than the first cam lower trough with respect to the first cam lower profile peak.

In some additional, alternative, or selectively cumulative embodiments, the second cam upper profile comprises a second cam upper profile peak, wherein the second cam lower profile comprises a second cam lower profile peak and a second cam lower trough, and wherein the second cam upper profile peak is taller than the second cam lower profile peak.

In some additional, alternative, or selectively cumulative embodiments, the second cam lower profile comprises a second cam upper trough, wherein the second cam upper trough is shallower than the second cam lower trough with respect to the second cam upper profile peak.

In some additional, alternative, or selectively cumulative embodiments, the first cam is further configured for movement about a first cam pin, and wherein the second cam is further configured for movement about a second cam pin.

In some additional, alternative, or selectively cumulative embodiments, depression of the first or second pedals maintains a specified distance between the first cam pin and the second cam pin, or the distance between the first cam pin and the second cam pin is preserved regardless of movement of the first pedal or second pedal.

In some additional, alternative, or selectively cumulative embodiments, the movement of the second pedal in the second pedal second direction is a predetermined fraction of the movement of the first pedal in the first pedal first direction.

In some additional, alternative, or selectively cumulative embodiments, movement of the first pedal in the first pedal second direction is a predetermined fraction of the movement of the second pedal in the second pedal first direction.

In some additional, alternative, or selectively cumulative embodiments, movement of the first cam about the first pin is rotational and movement of the second cam about second pin is rotational.

In some additional, alternative, or selectively cumulative embodiments, movement of the first pedal in the first pedal first direction is associated with movement of the vehicle in a forward direction, wherein movement of the second pedal in the second pedal first direction is associated with movement of the vehicle in a backward direction.

In some additional, alternative, or selectively cumulative embodiments, movement of the second pedal in the second pedal first direction is associated with movement of a vehicle in a forward direction, wherein the movement of the first pedal in the first pedal first direction is associated with movement of the vehicle in a backward direction.

In some additional, alternative, or selectively cumulative embodiments, a pedal arm is connected between the first pedal and the first cam.

In some additional, alternative, or selectively cumulative embodiments, a pedal arm is connected between the second pedal and the second cam.

In some additional, alternative, or selectively cumulative embodiments, the first pedal and the second pedal are adapted to be at a neutral position when the first cam upper profile engages the second cam upper profile and the first cam lower profile engages the second cam lower profile.

In some additional, alternative, or selectively cumulative embodiments, the first pedal first direction is downward.

In some additional, alternative, or selectively cumulative embodiments, the second pedal first direction is downward.

In some additional, alternative, or selectively cumulative embodiments, the first pedal and the first cam are operatively rigidly connected.

In some additional, alternative, or selectively cumulative embodiments, the second pedal and second cam are operatively rigidly connected.

In some additional, alternative, or selectively cumulative embodiments, in response to movement of the first pedal in the first pedal first direction, rotational movement is imparted from the first cam to the second cam via the engagement of the first cam upper profile with the second cam upper profile without engagement of the first cam lower profile with the second cam lower profile, wherein angular displacement of the second cam is in a rotational direction opposite to angular displacement of the first cam, wherein angular displacement of the second cam is of a lesser magnitude than the angular displacement of the first cam in response to movement of the first pedal in the first pedal first direction, wherein the second pedal is moved in the second pedal second direction that is substantially opposite to the first pedal first direction, and wherein movement of the second pedal in the second pedal second direction is of a lesser magnitude than movement of the first pedal in the first pedal first direction.

In some additional, alternative, or selectively cumulative embodiments, the second pedal second direction is substantially opposite to the first pedal first direction.

In some additional, alternative, or selectively cumulative embodiments, a first cam is operatively connected to the first pedal such that movement of the first pedal causes movement of the first cam about a first rotational axis and such that movement of the first cam about the first rotational axis causes movement of the first pedal, wherein the first cam has a first cam profile having a first cam upper profile and a first cam lower profile that are different; and a second cam is operatively connected to the second pedal such that movement of the second pedal causes movement of the second cam about a second rotational axis and such that movement of the second cam about the second rotational axis causes movement of the second pedal, wherein the second cam has a second cam profile having a second cam upper profile and a second cam lower profile that are different; wherein the first cam and the second cam are positioned relative to each other such that the first cam profile and the second cam profile face each other in a generally mating arrangement such that: one or more first cam upper points of the first cam upper profile that contact one or more second cam upper points of the second cam upper profile have respective first cam shorter distances to the first rotational axis, and one or more second upper cam points of the second cam upper profile that contact one or more first cam upper points of the first cam upper profile have respective second cam longer distances to the second rotational axis, wherein the second cam longer distances are longer than the first cam shorter distances, and wherein contact between the one or more first cam upper points with the one or more second cam upper points during rotation of the first upper cam about the first rotational axis in a first cam first rotational direction causes the second cam to rotate to a lesser amount about the second rotational axis in a second cam second rotational direction that is opposite to the first cam first rotational direction; and one or more first cam lower points of the first cam lower profile that contact one or more second cam lower points of the second cam lower profile have respective first cam longer distances to the first rotational axis, and one or more second lower cam points of the second cam lower profile that contact one or more first cam lower points of the first cam lower profile have respective second cam shorter distances to the second rotational axis, wherein the second cam shorter distances are shorter than the first cam longer distances, and wherein contact between the one or more second cam lower points with the one or more first cam lower points during rotation of the second cam about the second rotational axis in a second cam first rotational direction causes the first cam to rotate to a lesser amount about the first rotational axis in a first cam second rotational direction that is opposite to the second cam first rotational direction.

In some additional, alternative, or selectively cumulative embodiments, the first cam upper profile comprises a first cam shorter peak with a first shorter distance to a first rotational pin, wherein the first cam lower profile comprises a first cam longer peak with a first longer distance to the first rotational pin, wherein the first cam shorter peak is adapted to guide downward movement of the first pedal, wherein the first cam longer peak is adapted to guide upward movement of the first pedal, wherein the second cam upper profile comprises a second cam longer peak with a second longer distance to a second rotational pin, wherein the second cam lower profile comprises a second cam shorter peak with a second shorter distance to the second rotational pin, wherein the second cam shorter peak is adapted to guide downward movement of the second pedal, and wherein the second cam longer peak is adapted to guide upward movement of the second pedal to facilitate greater downward movement of the first pedal than upward movement of the second pedal in response to depression of the first pedal and to facilitate greater downward movement of the second pedal than upward movement of the first pedal in response to depression of the second pedal.

In some additional, alternative, or selectively cumulative embodiments, the second pedal second direction is substantially opposite to the first pedal first direction, wherein connection between the first pedal and the first cam is substantially rigid, wherein connection between the second pedal and second cam is substantially rigid, wherein movement of the first cam about a first pin is rotational, wherein movement of the second cam about a second pin is rotational, wherein the first cam upper profile comprises a first cam upper profile peak and a first cam upper trough, wherein the first cam lower profile comprises a first cam lower profile peak, wherein the first cam upper profile peak is shorter than the first cam lower profile peak, wherein the second cam upper profile comprises a second cam upper profile peak, wherein the second cam lower profile comprises a second cam lower profile peak and a second cam lower trough, wherein the second cam upper profile peak is taller than the second cam lower profile peak, and wherein, in response to movement of the first pedal in the first pedal first direction, angular displacement of the second cam is in a rotational direction opposite to angular displacement of the first cam and angular displacement of the second cam is of a lesser magnitude than the angular displacement of the first cam.

In some additional, alternative, or selectively cumulative embodiments, the pedal control mechanism is operatively connected to a sensor that operatively communicates with a throttle mechanism.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

DETAILED DESCRIPTION OF EMBODIMENTS

Figure 1A:
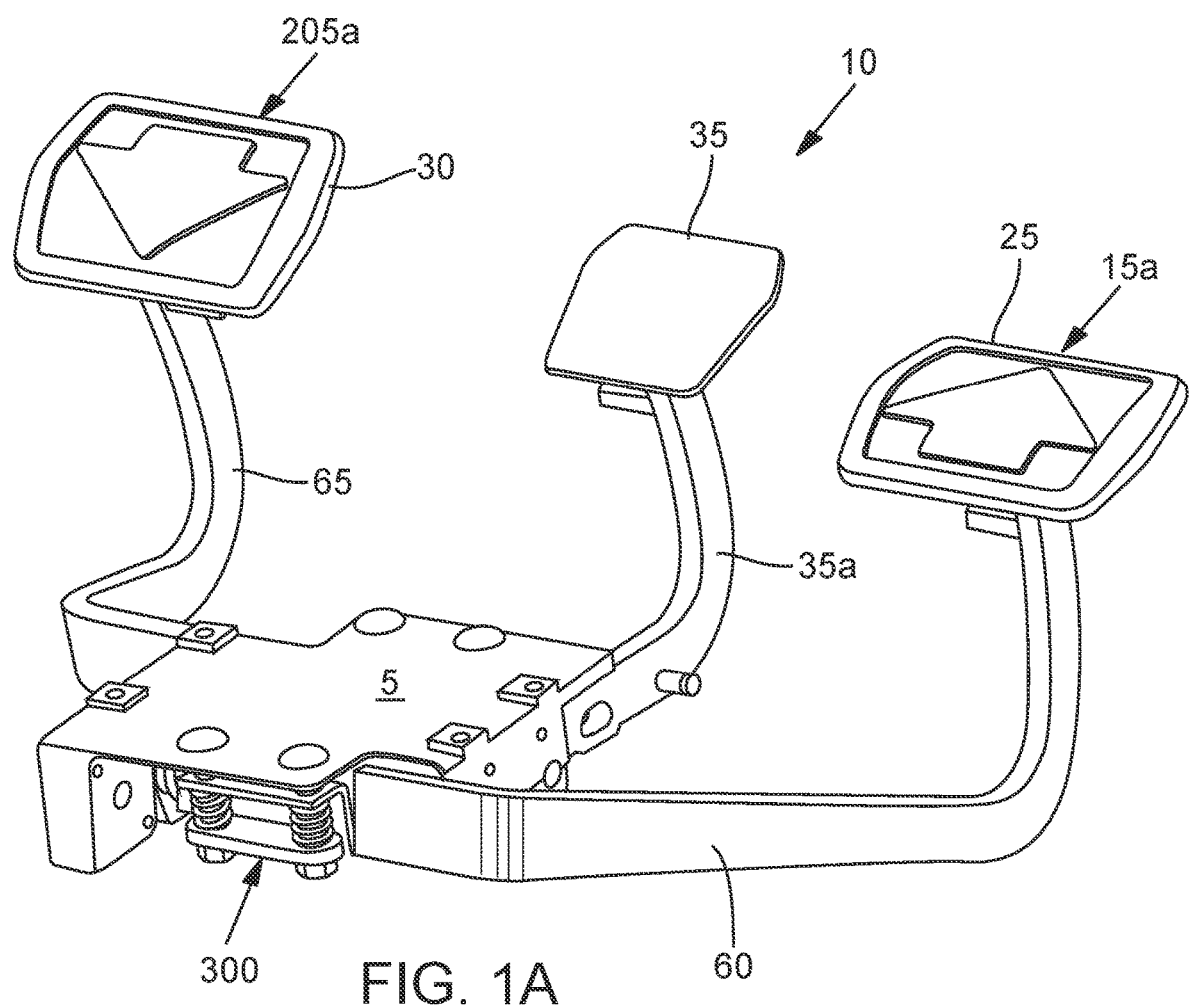
FIG. 1A is a front and right-side isometric drawing of a pedal assembly shown in a slightly depressed, right-pedal-down position, according to one embodiment.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Figure 1B:
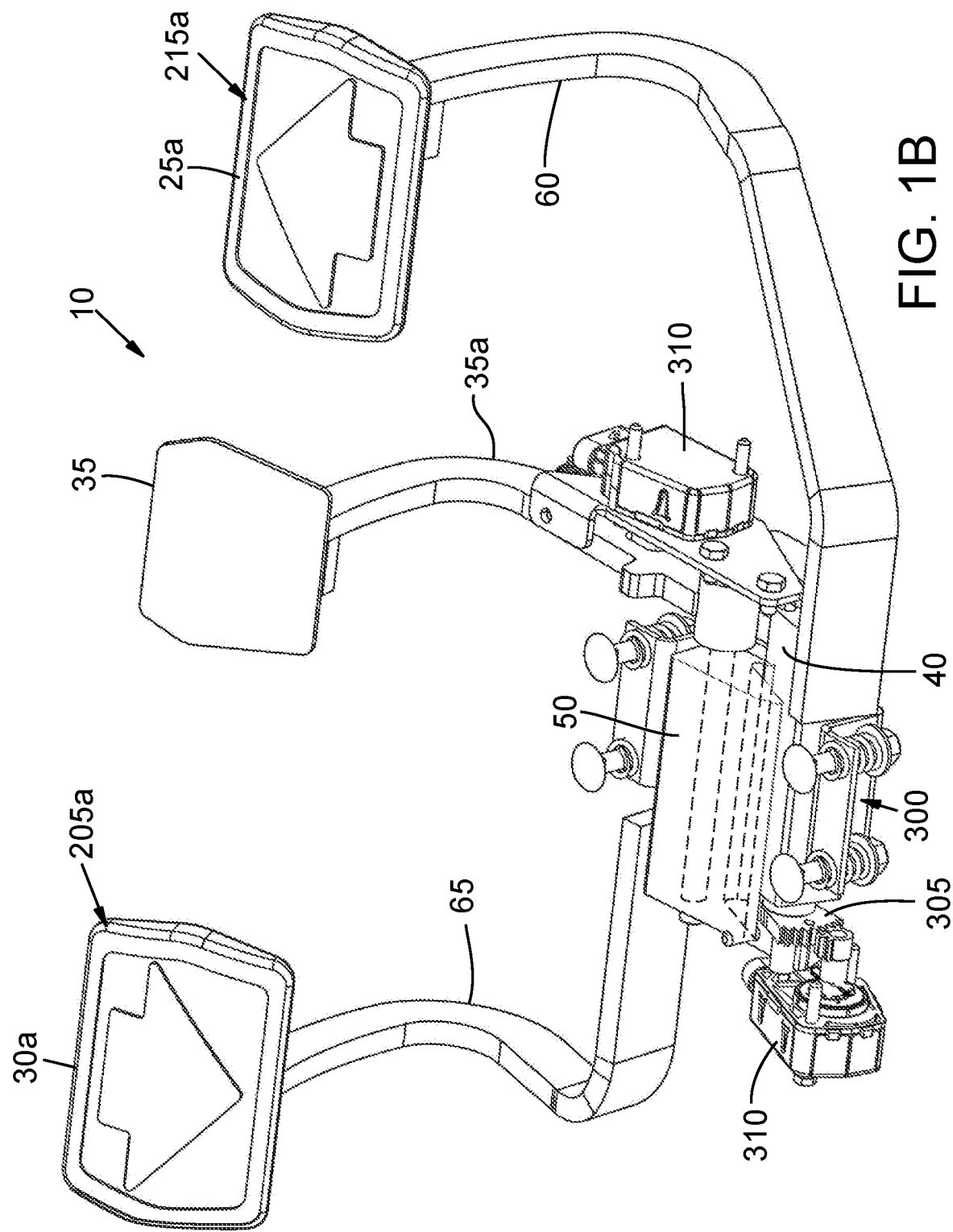
FIG. 1B is a front and right-side isometric drawing of a pedal assembly of FIG. 1A shown without a cover frame to expose a pedal control mechanism.
Figure 1C:
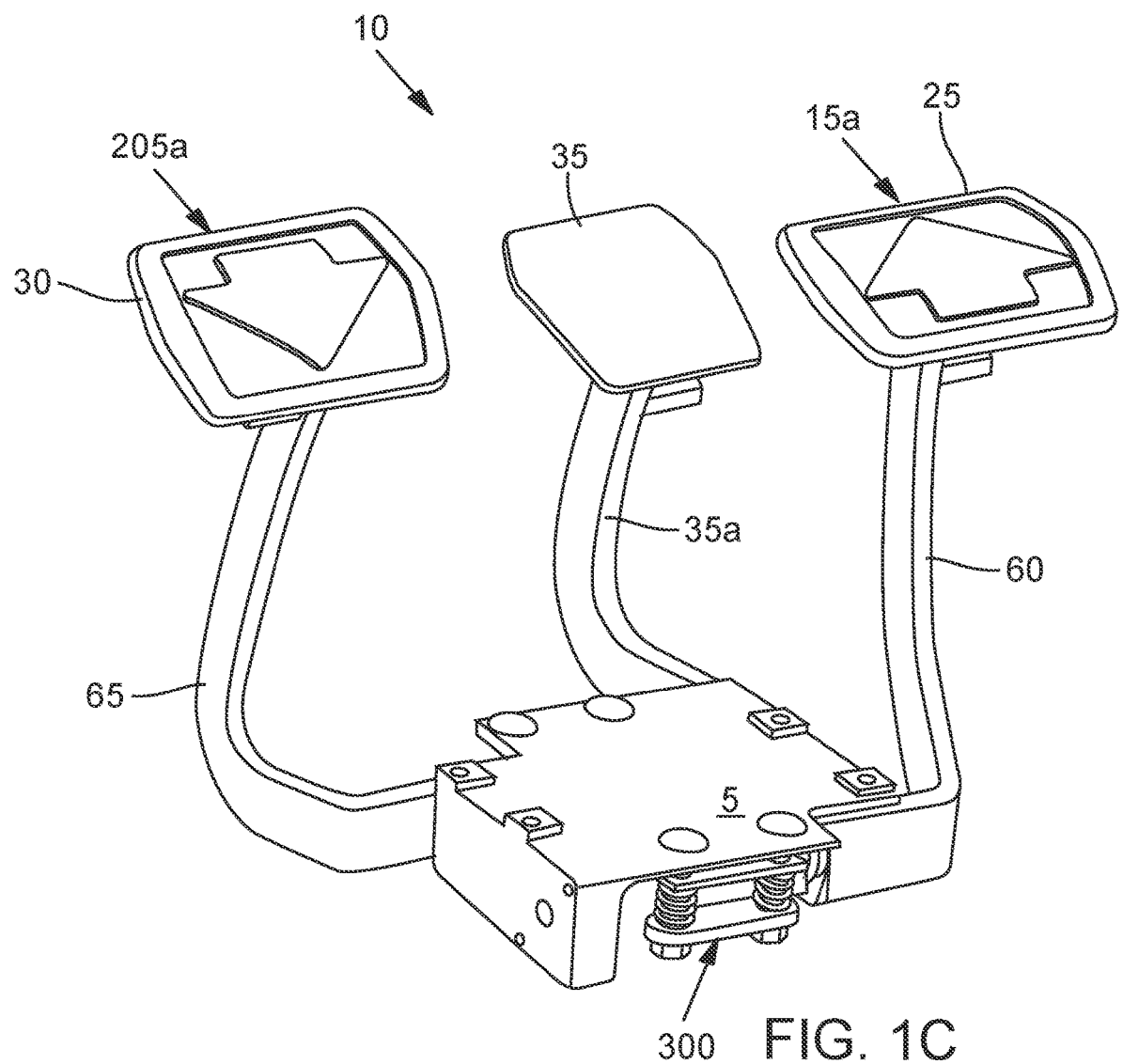
FIG. 1C is a front and left-side isometric drawing of the pedal assembly of FIG. 1A shown in a slightly depressed, right-pedal-down position.
Figure 2A:
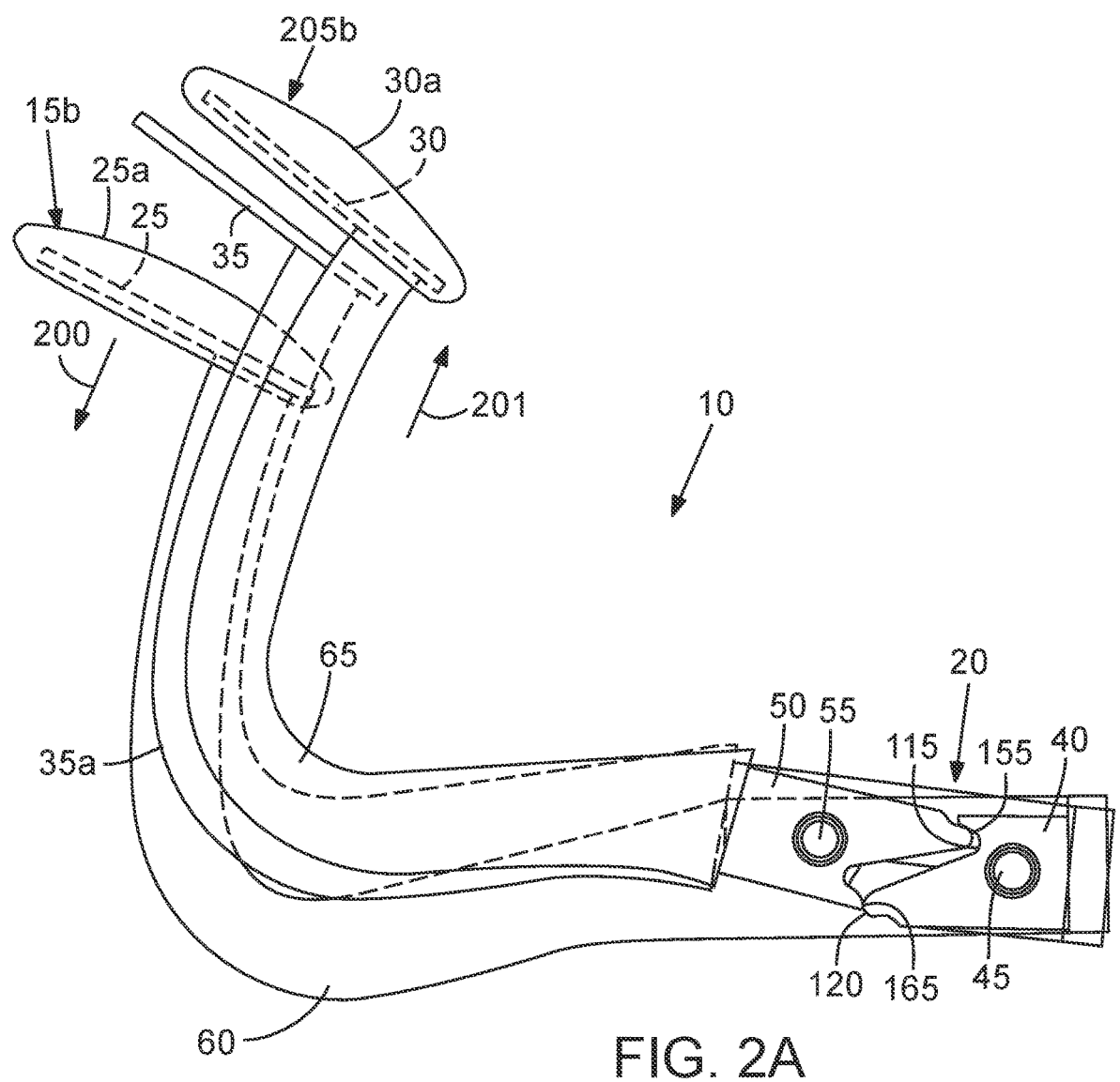
FIG. 2A is a left-side view of a pedal assembly similar to that of FIG. 1A in the slightly depressed, right-pedal-down position.
Figure 2B:
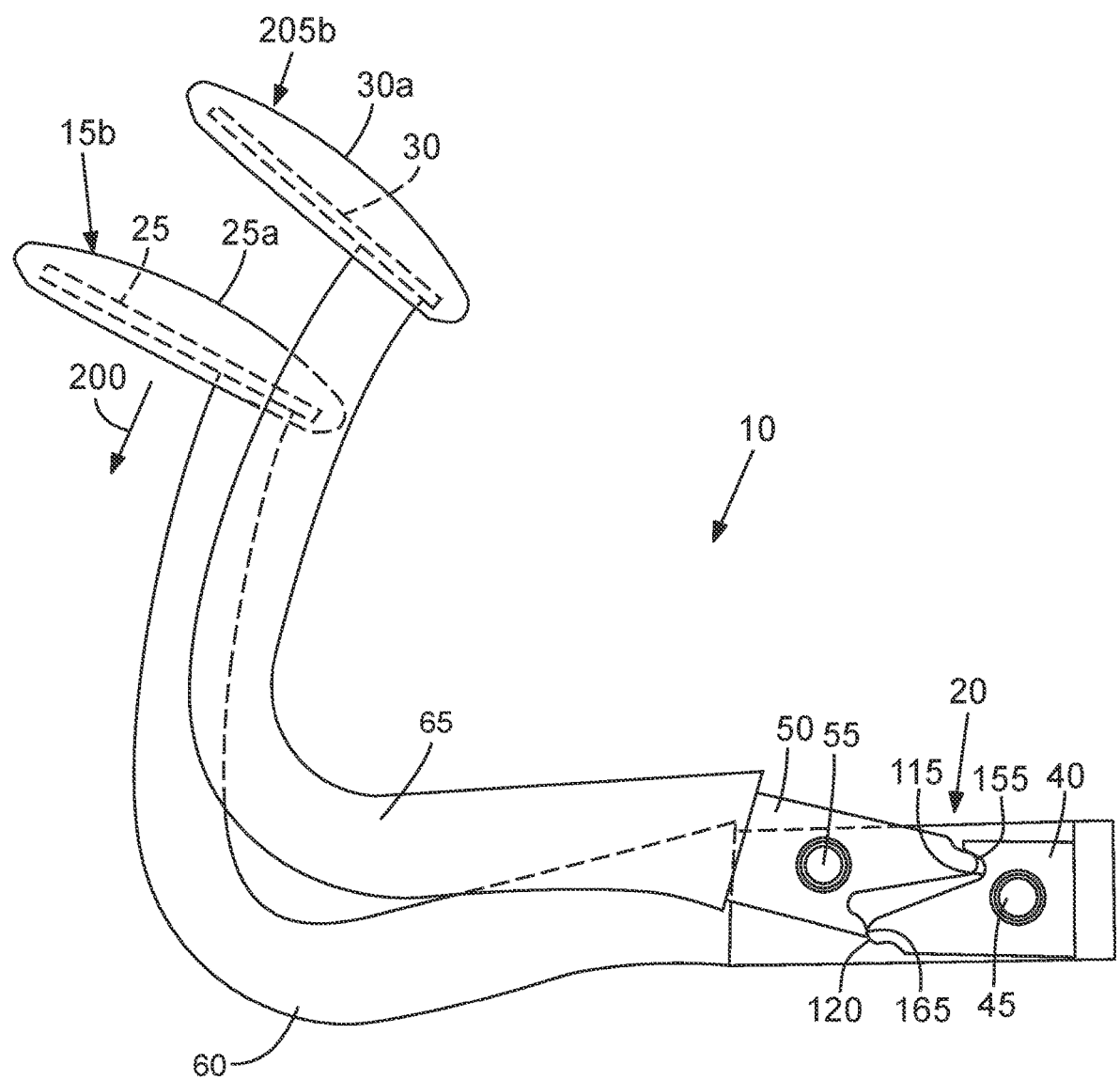
FIG. 2B is a left-side view of a pedal assembly similar to that of FIG. 1A in the slightly depressed, right-pedal-down position, shown without a brake pedal for greater clarity.
Figure 3A:
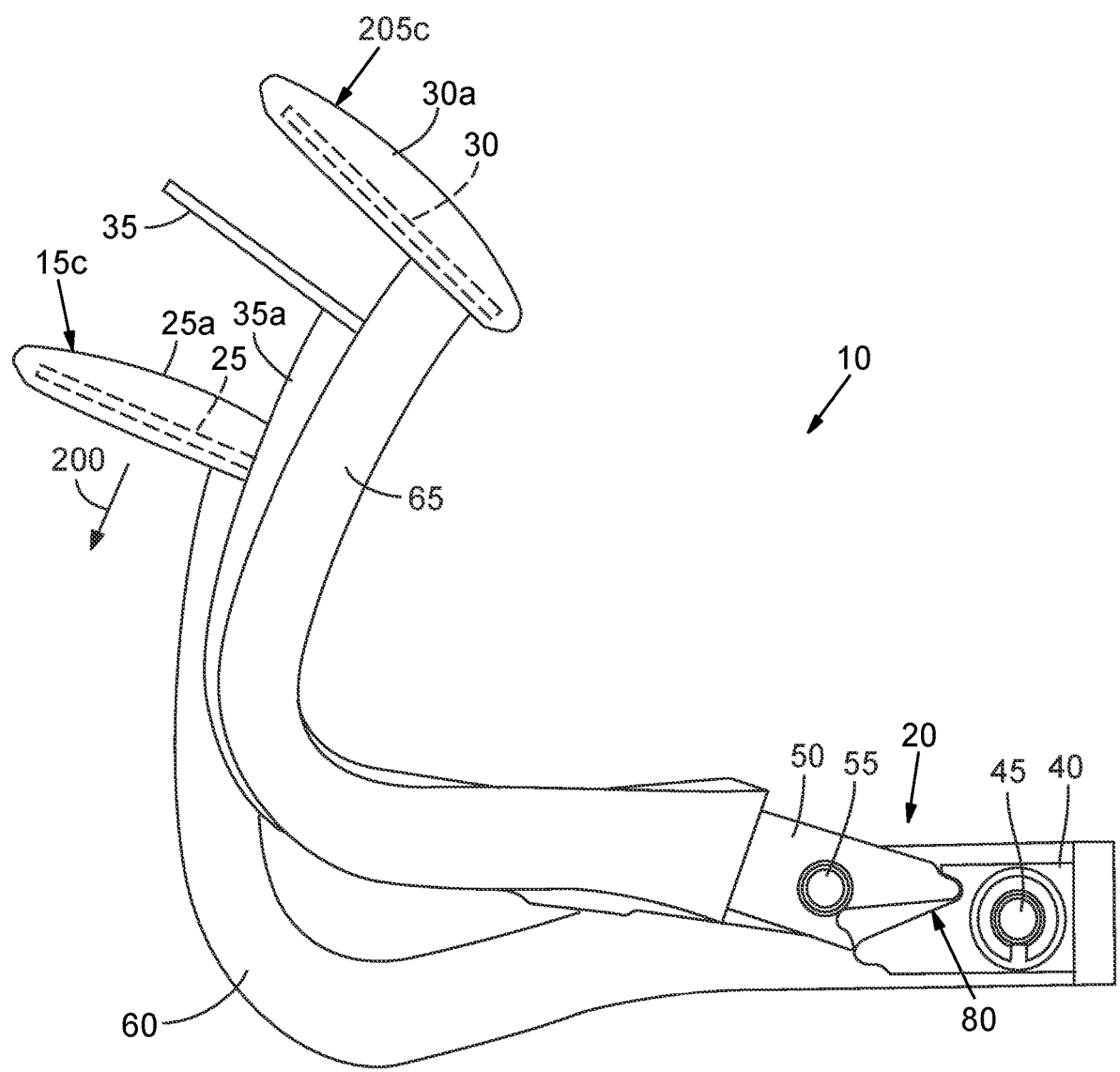
FIG. 3A is a left-side view of a pedal assembly similar to that of FIG. 1A in a more depressed, right-pedal-down position.
Figure 3B:
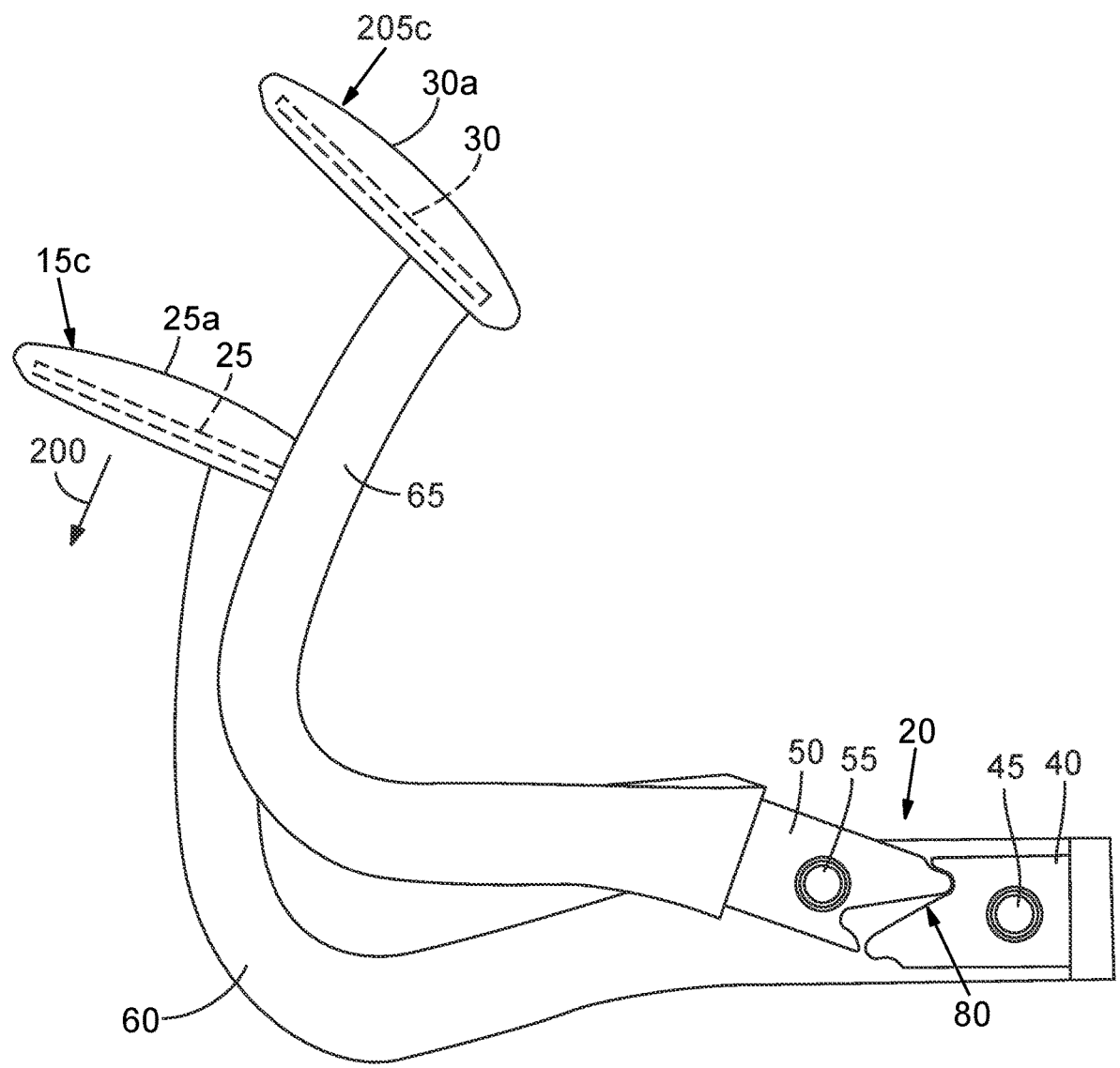
FIG. 3B is a left-side view of a pedal assembly similar to that of FIG. 1A in a more depressed, right-pedal-down position, shown without the brake pedal for greater clarity.
Figure 4A:
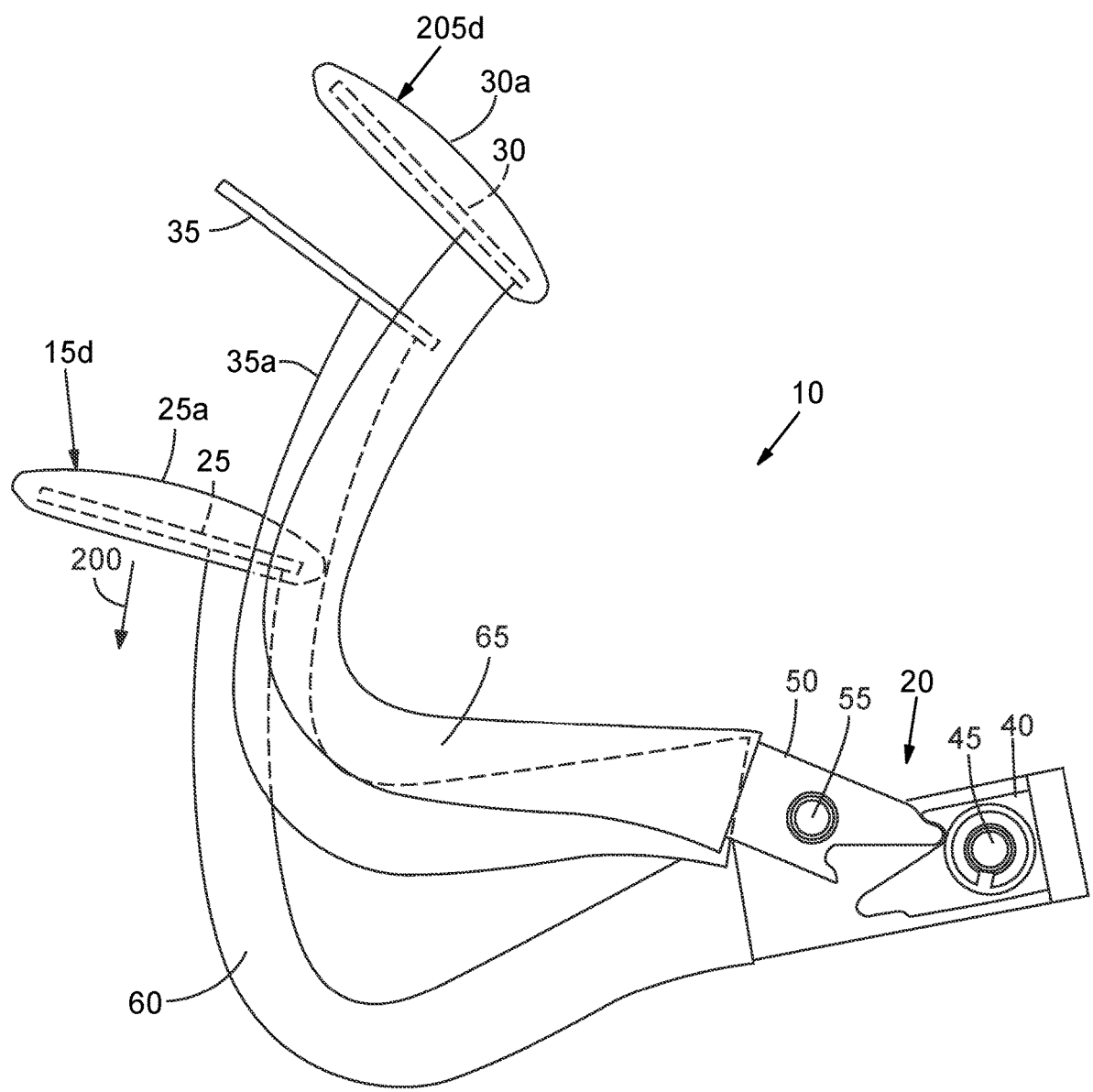
FIG. 4A is a left-side view of a pedal assembly similar to that of FIG. 1A in a greatly depressed, right-pedal-down position.
Figure 4B:
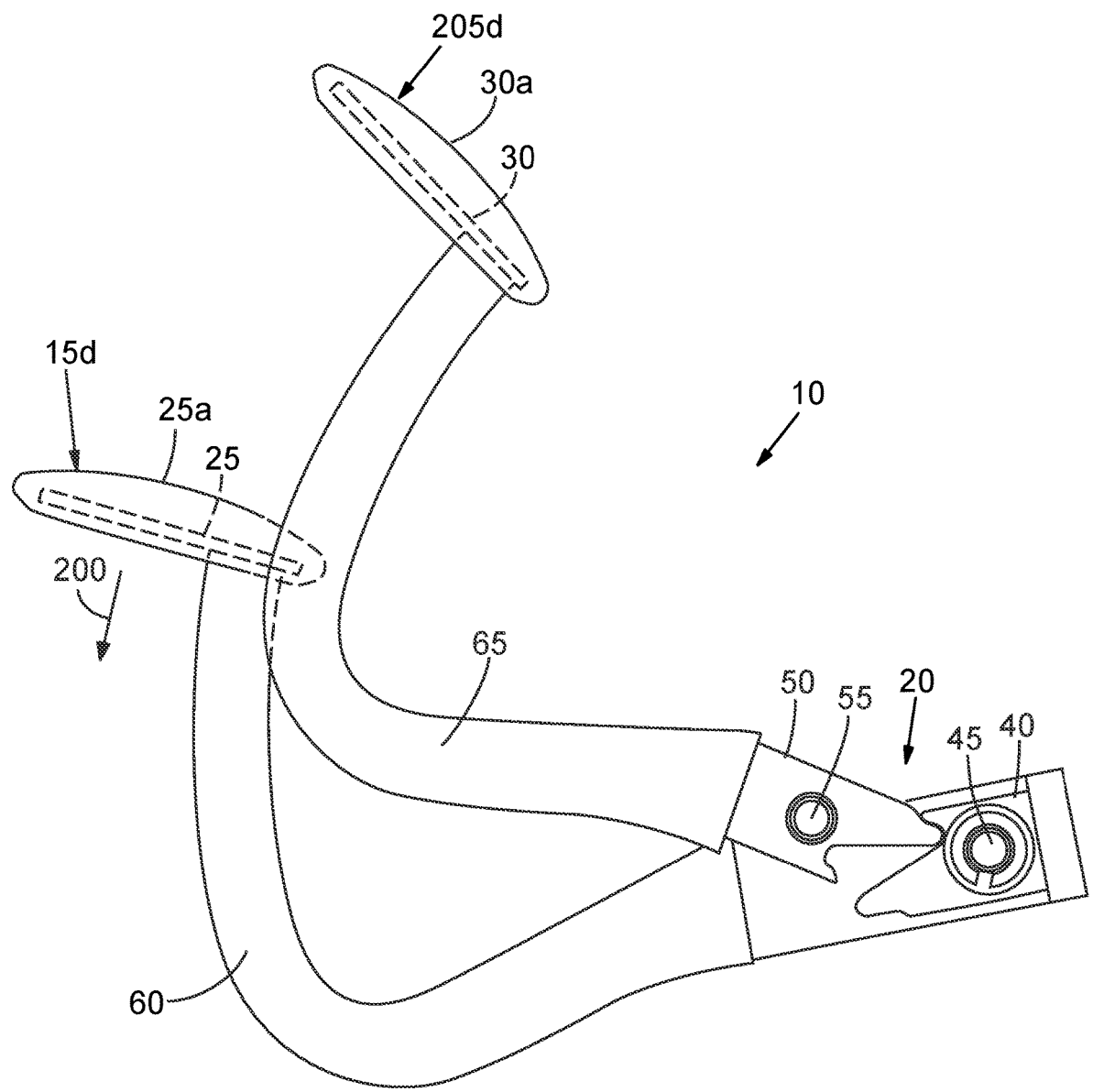
FIG. 4B is a left-side view of a pedal assembly similar to that of FIG. 1A in a greatly depressed, right-pedal-down position, shown without the brake pedal for greater clarity.

FIG. 1A is a front and right-side isometric drawing of a pedal assembly 10 shown in a slightly depressed, right-pedal-down position 15a; FIG. 1B is a front and right-side isometric drawing of the pedal assembly 10 of FIG. 1A shown without a cover frame 5 to expose a pedal control mechanism; FIG. 1C is a front and left-side isometric drawing of a pedal assembly 10 shown in a slightly depressed, right-pedal-down position 15a; FIG. 2A is a left-side view of a pedal assembly 10 similar to that shown in FIG. 1A in the slightly depressed, right-pedal-down position 15b; FIG. 2B is a left-side view of a pedal assembly 10 similar to that shown in FIG. 1A in the slightly depressed, right-pedal-down position 15b, shown without a brake pedal 35 for greater clarity; FIG. 3A is a left-side view of a pedal assembly 10 similar to that shown in FIG. 1A in a more depressed, right-pedal-down position 15c; FIG. 3B is a left-side view of a pedal assembly 10 similar to that shown in FIG. 1A in a more depressed, right-pedal-down position 15c, shown without the brake pedal 35 for greater clarity; FIG. 4A is a left-side view of a pedal assembly 10 similar to that shown in FIG. 1A in a greatly depressed, right-pedal-down position 15d; and FIG. 4B is a left-side view of a pedal assembly 10 similar to that shown in FIG. 1A in a greatly depressed, right-pedal-down position 15d, shown without the brake pedal 35 for greater clarity. FIGS. 1A, 1B, and 1C are collectively FIG. 1; FIGS. 2A and 2B are collectively FIG. 2; FIGS. 3A and 3B are collectively FIG. 3; and FIGS. 4A and 4B are collectively FIG. 4. Right-pedal-down positions 15a, 15b, 15c, and 15d are collectively right-pedal-down position(s) 15.

With reference to FIGS. 1-4, the pedal assembly 10 includes a pedal control mechanism 20 for controlling movement associated with a vehicle (not shown). Example vehicles include material-handling vehicles, such as lift trucks, or more specifically forklifts. The pedal control mechanism 20 typically includes two control pedals, such as a first pedal 25 and a second pedal 30, that are operatively connected to a drive source (such as an engine or motor connected to a power source such as a battery, liquid fuel, fuel cell, etc.) (not shown) and drive wheel(s) (not shown) to control acceleration of movement of the vehicle in opposite vehicle movement directions, such as first and second vehicle directions. The pedal control mechanism 20 may be operatively connected to a sensor (not shown) (such as through a gear) that operatively communicates with a throttle mechanism or other drive source controller (not shown) to control the amount of power that is operatively delivered to the drive wheel(s).

Typical vehicle directions include forward and reverse directions, but could include right side and left side directions, or clockwise or counterclockwise directions. In some embodiments, depression of the first pedal 25 is associated with causing acceleration movement in a first vehicle direction, and depression of the second pedal 30 is associated with causing movement in a second vehicle direction. Furthermore, depression of the first pedal 25 can be associated with causing acceleration movement in a forward vehicle direction, and depression of the second pedal 30 can be associated with causing movement in a reverse vehicle direction, although the opposite could also be implemented.

Although a binary pedal control mechanism 20 is exemplary, one will appreciate that additional pedals for additional acceleration control directions can be included. One will also appreciate that a steering mechanism (not shown) may be superimposed upon movement controlled by the pedal control mechanism 20 to provide multidirectional control of vehicle movement. One will further appreciate that the pedal assembly 10 may include one or more auxiliary pedals, such as a brake pedal 35, that are not tied to drive-related (such as engine-related or motor-related) directional movement control. The brake pedal 35 may be operatively connected through an auxiliary arm 35a to a mechanism (not shown) that arrests movement of the drive wheel(s).

The first pedal 25 is operatively connected to a first cam block 40 (also referred to as the first cam 40) in a manner such that movement of the first pedal 25 causes movement of the first cam 40 about a first pin 45 (or about a first axis of rotation) and, conversely, such that movement of the first cam 40 about the first pin 45 (or about the first axis of rotation) causes movement of the first pedal 25. Similarly, the second pedal 30 is operatively connected to a second cam block 50 (also referred to as the second cam 50) in a manner such that movement of the second pedal 30 causes movement of the second cam 50 about a second pin 55 (or about a second axis of rotation) and, conversely, such that movement of the second cam 50 about the second pin 55 (or about the second axis of rotation) causes movement of the second pedal 30.

Although the drawings show only one side of the pedal control mechanism 20 of the pedal assembly 10, one will appreciate that the pedal control mechanism 20 may optionally include a second set of first and second cams 40 and 50 connected to the respective first and second pedals 25 and 30. This second set of cams may be substantially identical to the first set of cams, or they may be different.

The operative connections between the pedals 25 and 30 and the cams 40 and 50 may be rigid connections without intervening pivot points but could include dampening or amplifying mechanisms. One will appreciate that non-rigid operative connections may alternatively be used. In some embodiments, the operative connections may include a first pedal arm 60 between the first pedal 25 and the first cam 40, and a second pedal arm 65 between the second pedal 30 and the second cam 50.

The first pedal 25 and the second pedal 30 may have identical sizes and shapes or different sizes and/or shapes. For example, the first pedal 25 may have identical shape but a larger size to that of the second pedal 30. Alternatively, the second pedal 30 may have a shape that is a mirror image of that of the first pedal 25. In some embodiments, the first pedal 25 and the second pedal 30 include respective pedal covers 25a and 30a that have one or more words or symbols, such as arrows, that indicate the direction of acceleration that depression of the given pedal would cause.

Similarly, the first and second pedal arms 60 and 65 may have identical shapes and sizes (except to accommodate for the different distances to the respective first and second cam pins 45 and 55) or completely different shapes and/or sizes. However, in some embodiments, the pedals arms can be either substantially identical or symmetric to each other except to accommodate for the different approaches to the respective cams 40 and 50 and the spacing between them (or more specifically the spacing between their rotational axes). In particular, if the first and second pedals 25 and 30 are to be positioned side by side in neutral pedal positions 325*a* (in a neutral throttle position 325) and the first and second cam pins 45 and 55 are spaced apart, then one pedal arm will be longer than the other. For example, FIG. 1 depicts an embodiment in which the first pedal arm 60 is significantly longer than the second pedal arm 65 to accommodate for the different approaches to the respective cams 40 and 50 and the spacing between their rotational axes. So in this embodiment, depression of the first pedal 25 would cause less angular movement of the first cam 40 around the first cam pin 45 than the same amount of depression of the second pedal 30 would angularly move the second cam 50 around the second cam pin 55.

Thus, different distance pedal lever arms, such as first and second pedal arms 60 and 65, from their respective first and second pedals 25 and 30 to their respective first and second pins 45 and 55 (or axes of rotation) may contribute to asymmetric changes in elevation of the respective first and second pedals 25 and 30 in response to pedal depression. One will appreciate that even if the first and second cam pins 45 and 55 were to be vertically spaced apart instead of laterally spaced apart, the first and second pedal arms 60 and 65 would still have different effective distances to the respective first and second cam pins 45 and 55 (when the first and second pedals 25 and 30 are in neutral positions 325*a*). To take advantage of the differences in angular displacement, the first and second cams 40 and 50 may be configured with different shapes, as later described.

The first pedal arm 60 may have dimensions such that the first pedal 25 has a vertical resting position that is different than the resting position of the second pedal arm 30. For example, the resting position of the first pedal 25 could be higher or lower or forward or backward compared to that of second pedal 30. In many embodiments, however, the first and second pedals 25 and 30 have equivalent resting positions, such as in a neutral throttle position 325 later described, regardless of whether the first and second pedal arms 60 and 65 are the same or different.

The first and second pins 45 and 55 may have identical shapes and sizes or different shapes and/or sizes. Typically, they are substantially identical and have a circular profile and provide rotational pivot points for the respective first and second cams 40 and 50. Although the first and second pins 45 and 55 are shown positioned through respective circular pin holes 70 and 75 (FIGS. 5 and 6) in the respective first and second cams 40 and 50, one will appreciate that the respective pin holes 70 and 75 could have slot-like, elliptical, or other shapes. One will appreciate that in some alternative embodiments, the cams and the pins may be integrally or rigidly connected or integrally formed. In such embodiments, the integrated cam-pin combinations may move (and/or rotate) in sockets in associated parts adapted to accommodate desired movement. In some of such embodiments, the integrated cam-pin combinations may rotate about respective first and second axes.

Figure 5:
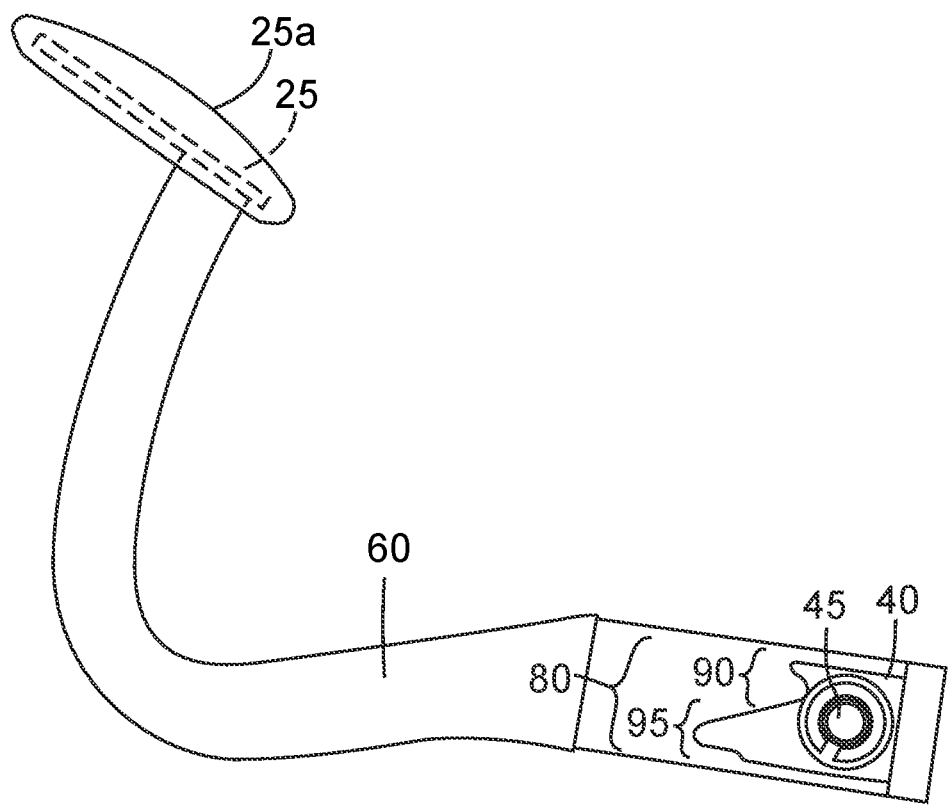
FIG. 5 is a left-side view of a right pedal, according to one embodiment.
Figure 6:
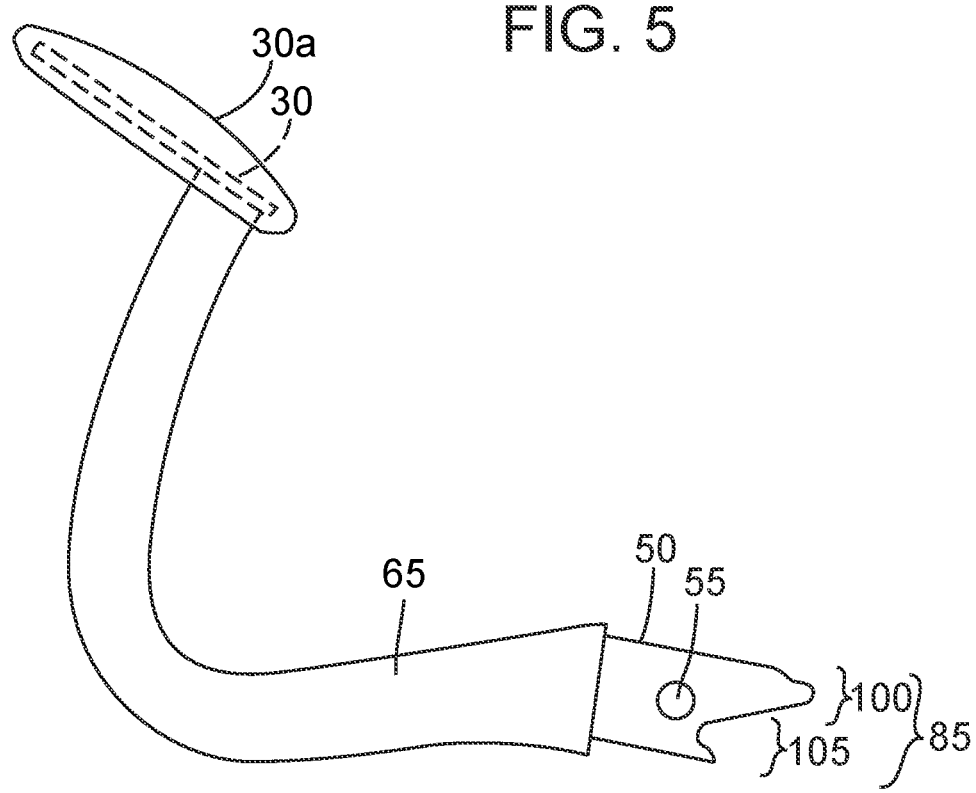
FIG. 6 is a left-side view of a left pedal, according to one embodiment.
Figure 7A:
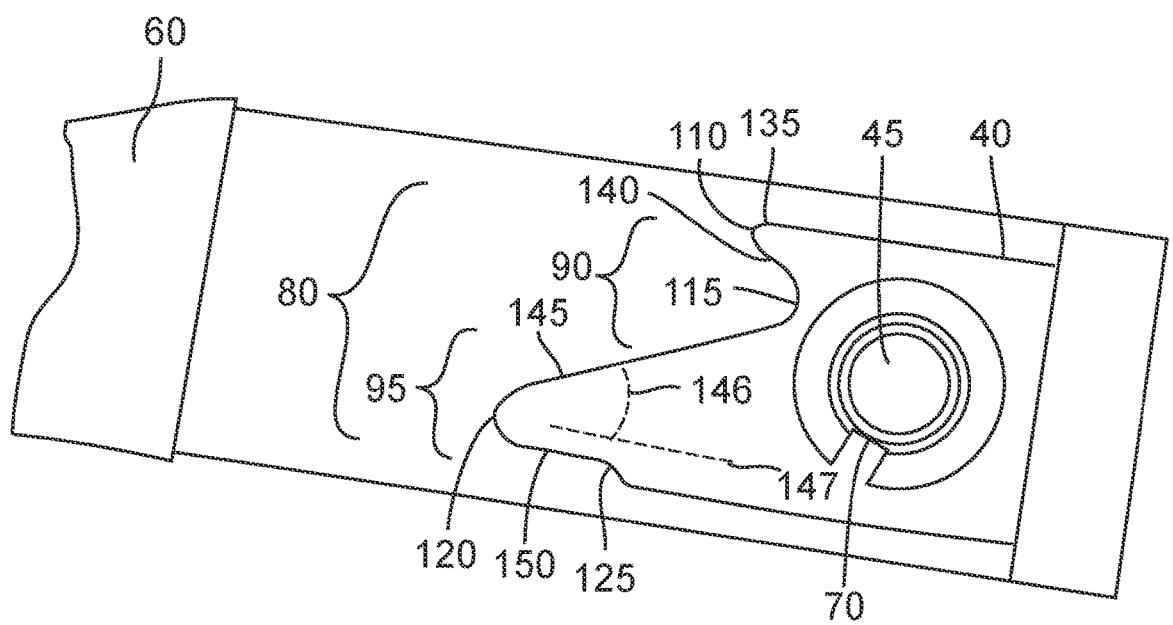
FIG. 7A is an enlarged left-side view of a right/rear cam associated with the right pedal, according to one embodiment.
Figure 8A:
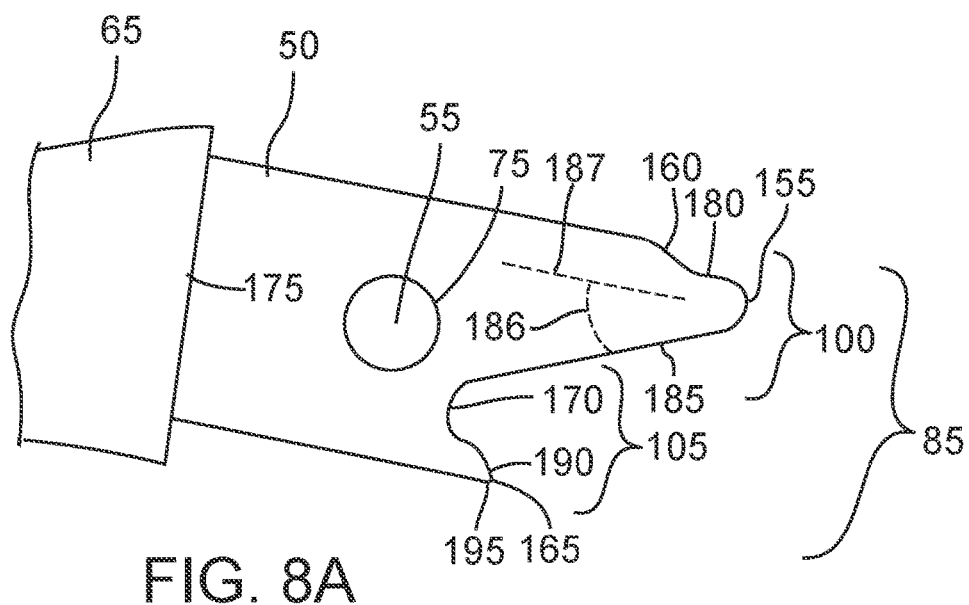
FIG. 8A is an enlarged left-side view of a left/front cam associated with the left pedal, according to one embodiment.
Figure 7B:
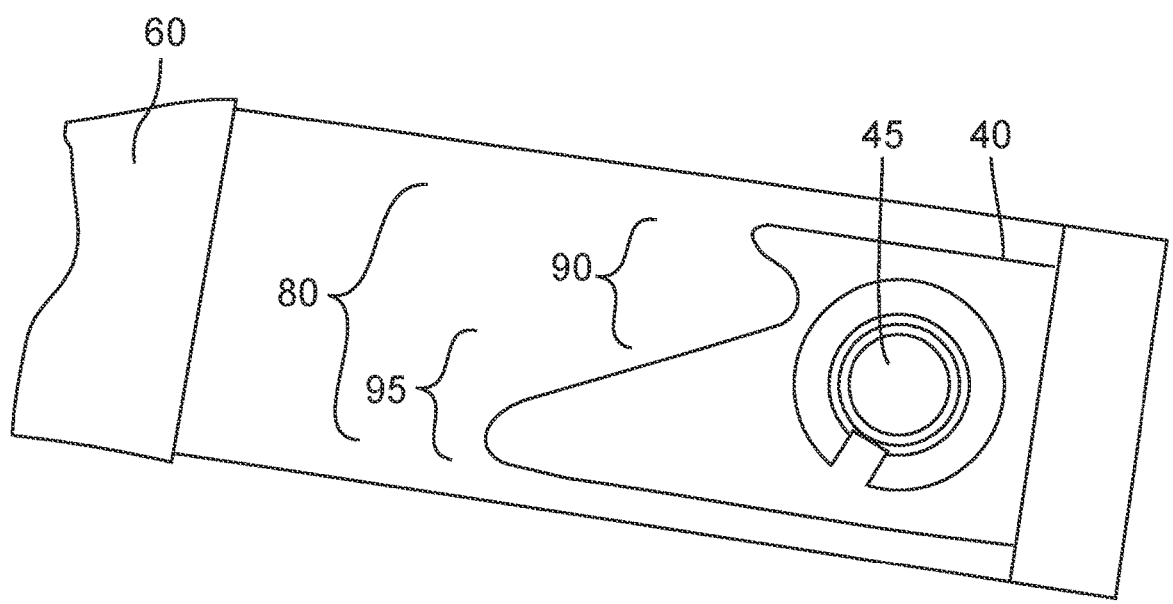
FIG. 7B is an enlarged left-side view of a right/rear cam associated with the right pedal, according to one alternative embodiment.
Figure 8B:
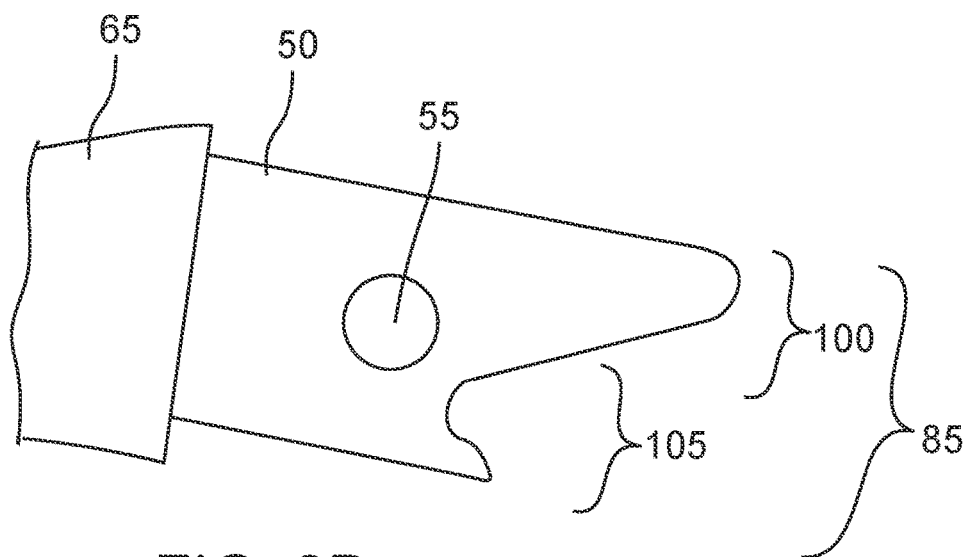
FIG. 8B is an enlarged left-side view of a left/front cam associated with the left pedal, according to one alternative embodiment.

FIG. 5 is a left-side view of the first pedal 25; FIG. 6 is a left-side view of the second pedal 30; FIGS. 7A and 7B are enlarged left-side views of exemplary embodiments of the first cam 40 associated with the first pedal 25; and FIGS. 8A and 8B are enlarged left-side views of exemplary embodiments of the second cam 50 associated with the second pedal 30. With reference to FIGS. 1-8 and particularly FIGS. 5-8, the first cam 40 has a first cam profile 80 and the second cam 50 has a second cam profile 85. The first cam profile 80 and the second cam profile 85 can be adapted to have a variety of interacting shapes or features that facilitate asymmetric changes in elevation of the respective first and second pedals 25 and 30 in response to pedal depression.

The first cam profile 80 typically includes a first cam upper profile 90 and a first cam lower profile 95. The second cam profile 85 typically includes a second cam upper profile 100 and a second cam lower profile 105. The first cam upper profile 90 may include a first cam upper profile peak 110 and a first cam upper trough 115, and the first cam lower profile 95 may include a first cam lower profile peak 120 and a first cam lower trough 125. In some embodiments, the first cam lower trough 125 may be optionally omitted such as shown on FIG. 7B.

The first cam upper profile 90 may be asymmetric with respect to the first cam lower profile 95. In particular, the first cam upper profile peak 110 may have one or more characteristics that are different from those of the first cam lower profile peak 120. For example, the first cam upper profile peak 110 may have a different height than that of the first cam lower profile peak 120. The heights of the first cam upper profile peak 110 and the first cam lower profile peak 120 may be assessed with respect to the distance to the first pin 45, to the first pin hole 70, to a line intersecting the center of the first pin 45 or the first pin hole 70 and perpendicular to the height, or to a first cam base 130. In the shown embodiment, the first cam upper profile peak 110 is shorter than the first cam lower profile peak 120, but one will appreciate that the relative heights could be different or reversed. Similarly, the widths of the first cam upper profile peak 110 and the first cam lower profile peak 120 may be different. In the shown embodiment, the first cam upper profile peak 110 is narrower than the first cam lower profile peak 120, but one will appreciate that the relative widths could be different or reversed.

The first cam upper profile peak 110 may have a height that is less than or equal to 50% of the height of the first cam lower profile peak 120. Alternatively, the first cam upper profile peak 110 may have a height that is less than or equal to 33% of the height of the first cam lower profile peak 120. Alternatively, the first cam upper profile peak 110 may have a height that is less than or equal to 25% of the height of the first cam lower profile peak 120. However, the relative heights can be outside these ranges.

One will also appreciate that the first cam upper profile peak 110 may have a first upper peak higher side slope 135 that is different from that of a first upper peak lower side slope 140. In the shown embodiment, the first upper peak higher side slope 135 has an average slope that is steeper than the first upper peak lower side slope 140, but one will appreciate that the relative slopes could be different or reversed. Similarly, the first cam lower profile peak 120 may have a first lower peak higher side slope 145 that is different from that of a first lower peak lower side slope 150. In the shown embodiment, the first lower peak higher side slope 145 has an average slope that is more gradual than the first lower peak lower side slope 150, but one will appreciate that the relative slopes could be different or reversed.

The first lower peak higher side slope 145 may have an average slope angle 146 that is between 20 degrees and 70 degrees with respect to a height-wise axis 147 (FIG. 7A) associated with the first cam lower profile peak 120. Alternatively, the first lower peak higher side slope 145 may have an average slope angle 146 that is between 30 degrees and 60 degrees with respect to a height-wise axis 147 associated with the first cam lower profile peak 120. Alternatively, the first lower peak higher side slope 145 may have an average slope angle 146 that is between 35 degrees and 55 degrees with respect to a height-wise axis 147 associated with the first cam lower profile peak 120. However, the average slope angle 146 can be outside these ranges.

Alternative to or additional to differences between the first cam upper profile peak 110 and the first cam lower profile peak 120, the first cam upper trough 115 may have one or more characteristics that are different from those of the first cam lower trough 125. For example, the first cam upper trough 115 may have a different depth than that of the first cam lower trough 125. The depths may be assessed with respect to the distance to the first pin 45, to the first pin hole 70, to a line intersecting the center of the first pin 45 or the first pin hole 70 and perpendicular to the height, to the first cam base 130, to the height of either of the peaks, or to the respective peak (more closely corresponding to the trough). In the shown embodiment, the first cam upper trough 115 is deeper than the first cam lower trough 125 with respect to the first cam base 130, but one will appreciate that the relative depths could be different or reversed. However, in the shown embodiment, the first cam upper trough 115 is shallower with respect to the first cam upper profile peak 110 than is the first cam lower trough 125 with respect to the first cam lower profile peak 120, but one will appreciate that the relative depths could be different or reversed. Similarly, the widths of the first cam upper trough 115 and the first cam lower trough 125 may be different. In the shown embodiment, the first cam upper trough 115 is wider than the first cam lower trough 125, but one will appreciate that the relative widths could be different or reversed.

The second cam upper profile 100 may include a second cam upper profile peak 155 and a second cam upper trough 160, and the second cam lower profile 105 may include a second cam lower profile peak 165 and a second cam lower trough 170. In some embodiments, the second cam upper trough 170 may be optionally omitted such as shown on FIG. 8B.

The second cam upper profile 100 may be asymmetric with respect to the second cam lower profile 105. In particular, the second cam upper profile peak 155 may have one or more characteristics that are different from those of the second cam lower profile peak 165. For example, the second cam upper profile peak 155 may have a different height than that of the second cam lower profile peak 165. The heights of the second cam upper profile peak 155 and the second cam lower profile peak 165 may be assessed with respect to the distance to the second pin 55, to the second pin hole 75, to a line intersecting the center of the second pin 55 or the second pin hole 75 and perpendicular to the height, or to a second cam base 175. In the shown embodiment, the second cam upper profile peak 155 is taller than the second cam lower profile peak 165, but one will appreciate that the relative heights could be different or reversed. Similarly, the widths of the second cam upper profile peak 155 and the second cam lower profile peak 165 may be different. In the shown embodiment, the second cam upper profile peak 155 is wider than the second cam lower profile peak 165, but one will appreciate that the relative widths could be different or reversed.

The second cam upper profile peak 155 may have a height that is greater than or equal to double the height of the second cam lower profile peak 165. Alternatively, the second cam upper profile peak 155 may have a height that is greater than or equal to triple the height of the second cam lower profile peak 165. Alternatively, the second cam upper profile peak 155 may have a height that is greater than or equal to quadruple the height of the second cam lower profile peak 165. However, the relative heights can be outside these ranges.

One will also appreciate that the second cam upper profile peak 155 may have a second upper peak higher side slope 180 that is different from that of a second upper peak lower side slope 185. In the shown embodiment, the second upper peak higher side slope 180 has an average slope that is steeper than the second upper peak lower side slope 185, but one will appreciate that the relative slopes could be different or reversed. Similarly, the second cam lower profile peak 165 may have a second lower peak higher side slope 190 that is different from that of a second lower peak lower side slope 195. In the shown embodiment, the second upper peak higher side slope 190 has an average slope that is more gradual than the second upper peak lower side slope 195, but one will appreciate that the relative slopes could be different or reversed.

The second upper peak lower side slope 185 may have an average slope angle 186 that is between 20 degrees and 70 degrees with respect to a height-wise axis 187 (FIG. 8A) associated with the second cam upper profile peak 155. Alternatively, the second upper peak lower side slope 185 may have an average slope angle 186 that is between 30 degrees and 60 degrees with respect to a height-wise axis 187 associated with the second cam upper profile peak 155. Alternatively, the second upper peak lower side slope 185 may have an average slope angle 186 that is between 35 degrees and 55 degrees with respect to a height-wise axis 187 associated with the second cam upper profile peak 155. However, the average slope angle 186 can be outside these ranges.

Alternative to or additional to differences between the second cam upper profile peak 155 and the second cam lower profile peak 165, the second cam upper trough 160 may have one or more characteristics that are different from those of the second cam lower trough 170. For example, the second cam upper trough 160 may have a different depth than that of the second cam lower trough 170. The depths may be assessed with respect to the distance to the second pin 55, to the second pin hole 75, to a line intersecting the center of the second pin 55 or the second pin hole 75 and perpendicular to the height, to the second cam base 175, to the height of either of the peaks, or to the respective peak (more closely corresponding to the trough). In the shown embodiment, the second cam upper trough 160 is shallower than the second cam lower trough 170 with respect to the second cam base 175, but one will appreciate that the relative depths could be different or reversed. However, in the shown embodiment, the second cam upper trough 160 is deeper with respect to the second cam upper profile peak 155 than is the second cam lower trough 170 with respect to the second cam lower profile peak 165, but one will appreciate that the relative depths could be different or reversed. Similarly, the widths of the second cam upper trough 160 and the second cam lower trough 170 may be different. In the shown embodiment, the second cam upper trough 160 is narrower than the second cam lower trough 170, but one will appreciate that the relative widths could be different or reversed.

Figure 9A:
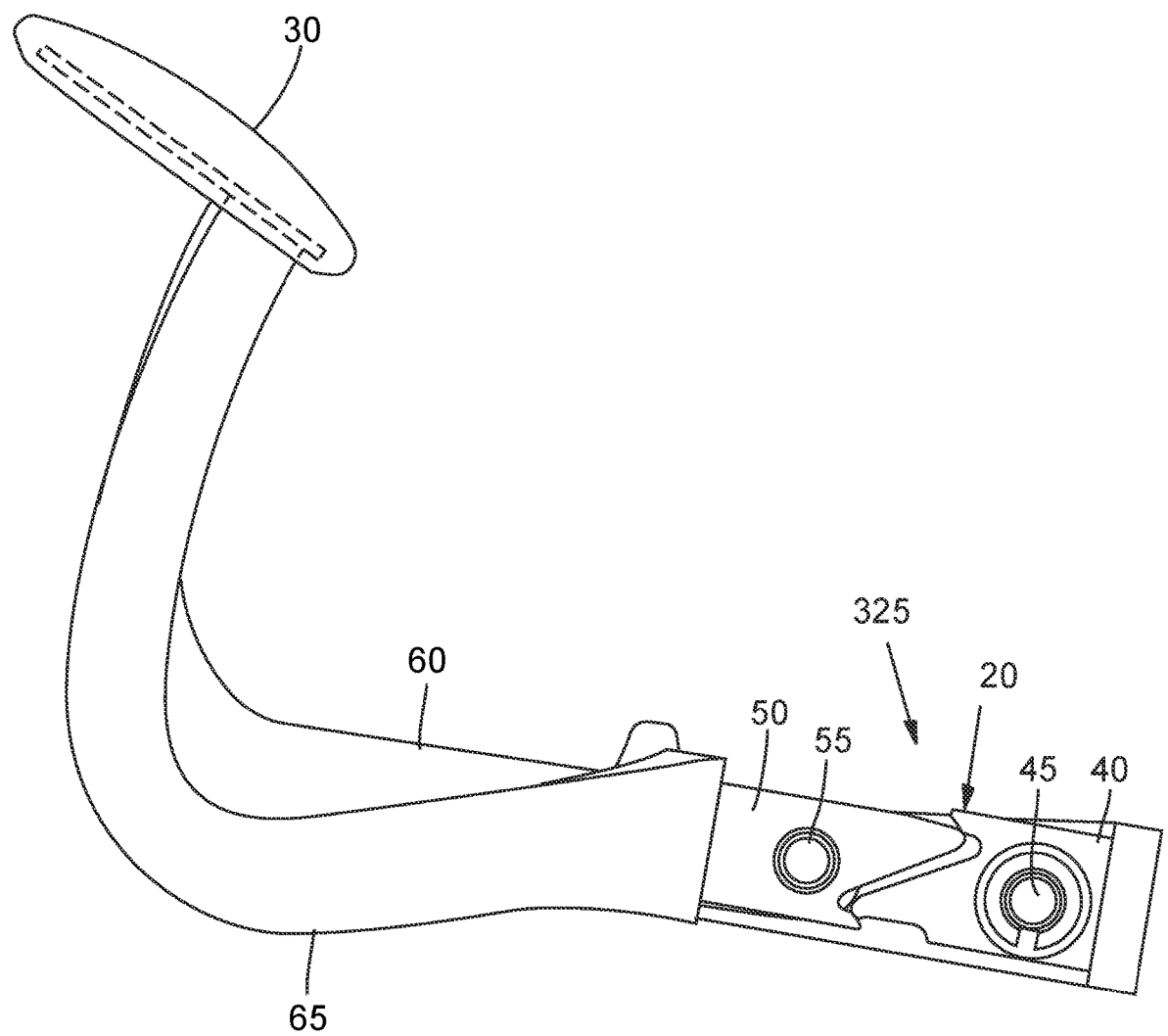
FIG. 9A is a left-side view of a pedal assembly in a neutral position, according to one embodiment.

The first cam profile 80 and the second cam profile 85 may have substantially identical shapes but different orientations. In particular, the second cam profile 85 may be oriented 180 degrees with respect to the first cam profile 80 in the neutral position 325, such as shown in FIG. 9A. In many circumstances, such identical cams would create different vertical first and second pedal displacements in response to the same amount of opposite pedal depression due to differences in pedal arm lengths to the rotational pins. For example, as depicted in the figures, depression of the second pedal 30 would cause more angular movement of the second cam 50 around the second cam pin 55 than the same amount of depression of the first pedal 25 would angularly move the first cam 40 around the first pin 45.

Thus, for many embodiments, the first cam profile 80 and the second cam profile 85 may be designed to have differences. These differences can be designed to compensate for differences in angular movement of the cams so that the smaller amount of lift of each pedal is equal in response to a given amount of pedal depression. Thus, the first cam profile 80 and the second cam profile 85 may be different from each other regardless of orientation. In addition to differences between the first and second cam profiles 80 and 85 to address issues related to effective differences in length of the respective first and second cam arms 60 and 65, the peaks within each cam profile may be different to create different distances between the peaks and the cam pin to cause unequal upwards pedal movement in response to opposite pedal depression. In particular, by having a shorter cam distance to the rotational pin (or axis of rotation) for the downward moving pedal and a longer one on the upward moving pedal, this arrangement allows the travel of the pedal moving down to be moved further than the one moving up.

The amount of differential displacement may be ergonomically determined. A typical upward displacement of one pedal may be 35% to 65% of the downward displacement of the other pedal. Another suitable range for upward pedal displacement may be from 40% to 60% of opposite pedal depression. One other suitable range for upward pedal displacement may be from 45% to 55% of opposite pedal depression. One will appreciate that the upward pedal displacement may be outside these ranges.

Accordingly, the first cam upper profile peak 110 can be different from the first cam lower profile peak 120, the second cam upper profile peak 155, and the second cam lower profile peak 165. Similarly, the second cam upper profile peak 155 can be different from the second cam lower profile peak 165, the first cam upper profile peak 110, and the first cam lower profile peak 120. For example, the first cam upper profile peak 110 of the first cam profile 80 may have a different height and/or slope than that of the second cam lower profile peak 165 of the second cam profile 85. In particular, with reference to FIGS. 7A and 8A, the first cam upper profile peak 110 to its rotational axis is longer than the distance from the second cam lower profile peak 165 to its rotational axis. Similarly, the first cam lower profile peak 120 of the first cam profile 80 may have a different height and/or slope than that of the second cam upper profile peak 155 of the second cam profile 85. In particular, with reference to FIGS. 7A and 8A, the first cam lower profile peak 120 to its rotational axis is shorter than the distance from the second cam upper profile peak 155 to its rotational axis. Alternatively or additionally, the troughs of the first cam profile 80 may have different characteristics than the corresponding troughs of the second cam profile 85.

Figure 9B:
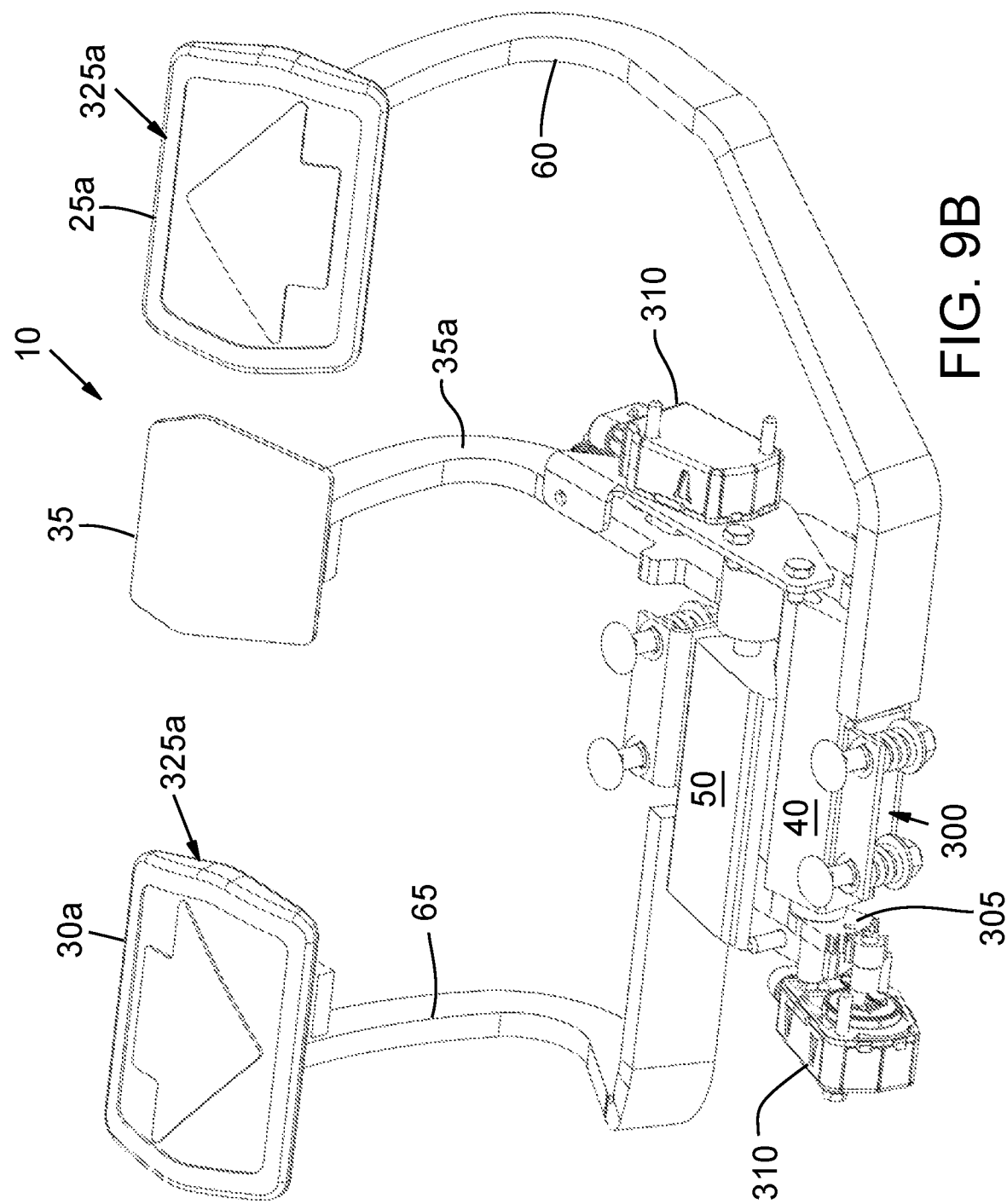
FIG. 9B is a front and right-side isometric drawing of a pedal assembly shown in a neutral position without the cover frame to expose the pedal control mechanism, according to one embodiment.
Figure 9C:
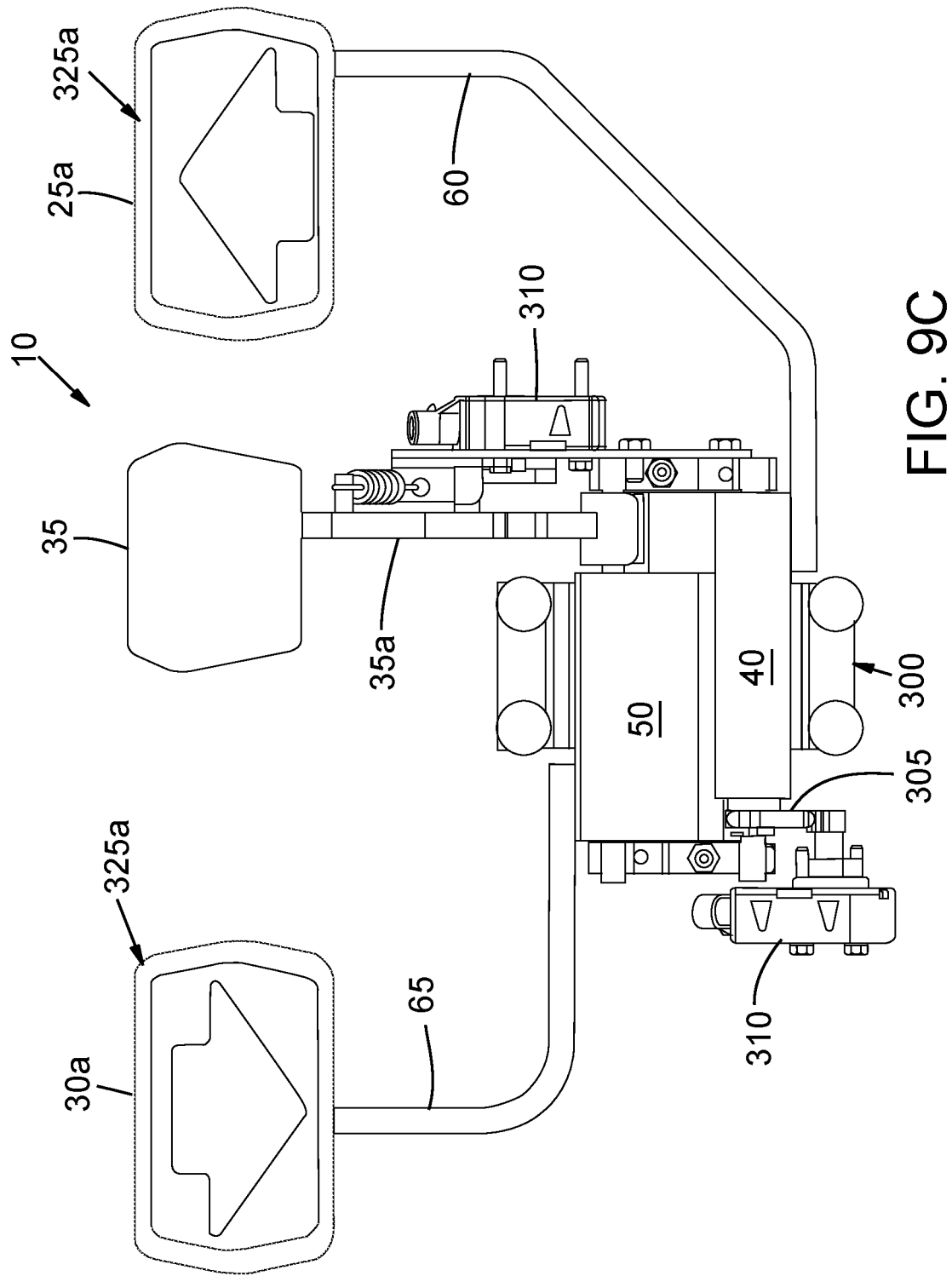
FIG. 9C is a top plan drawing of a pedal assembly of FIG. 9B shown in a neutral position without the cover frame to expose the pedal control mechanism.
Figure 9D:
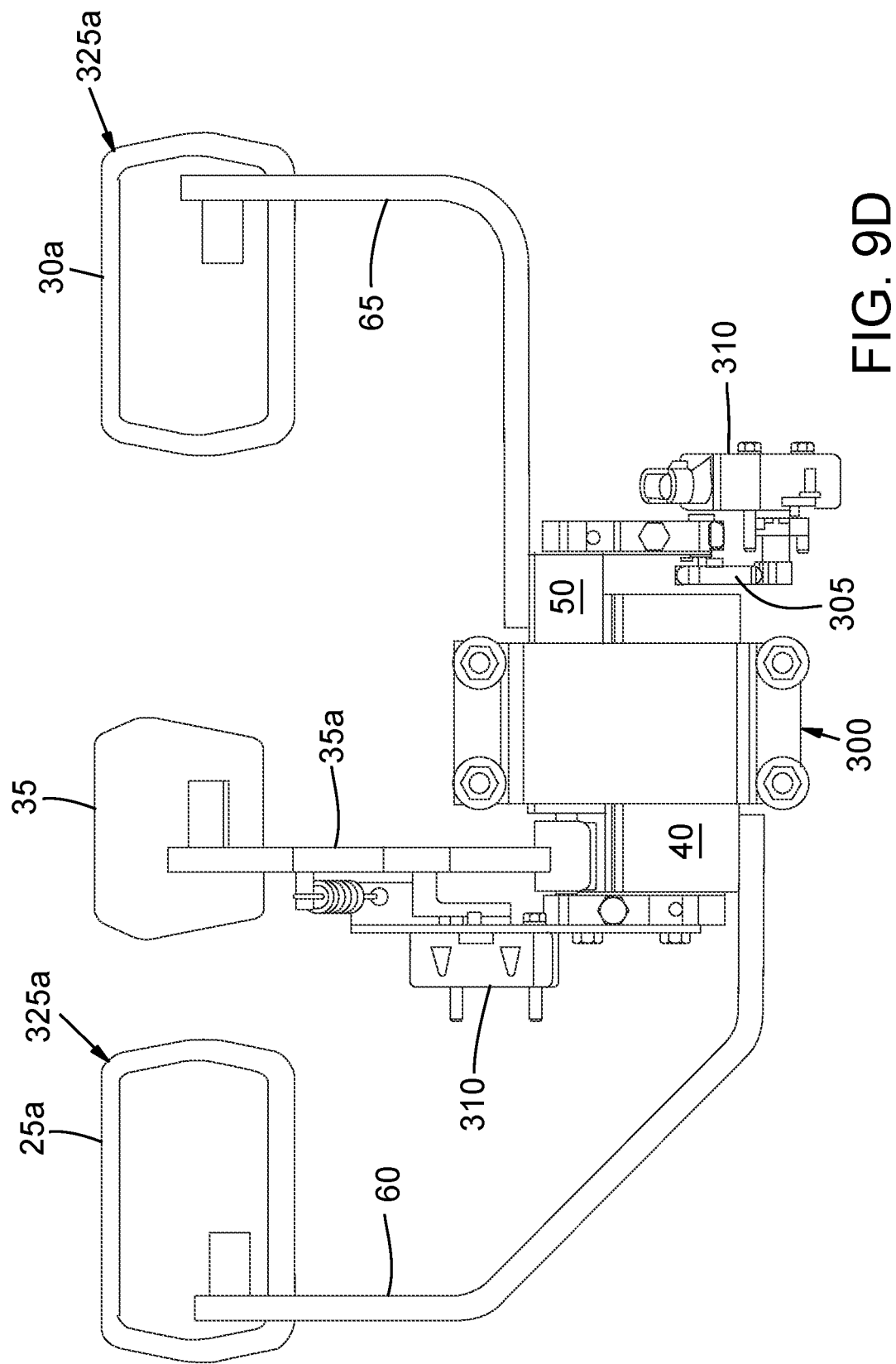
FIG. 9D is a bottom drawing of a pedal assembly of FIG. 9B shown in a neutral position without the cover frame to expose the pedal control mechanism.

FIG. 9A is a left-side view of a pedal assembly 10 in a neutral throttle position 325; FIG. 9B is a front and right-side isometric drawing of the pedal assembly 10 shown in a neutral throttle position 325 without the cover frame 5 to expose the pedal control mechanism 20, according to one embodiment; FIG. 9C is a top plan drawing of the pedal assembly 10 of FIG. 9B shown in a neutral throttle position 325 without the cover frame 5 to expose the pedal control mechanism 20; and FIG. 9D is a bottom drawing of the pedal assembly of FIG. 9B shown in a neutral throttle position 325 without the cover frame 5 to expose the pedal control mechanism 20. For convenience, FIGS. 9A, 9B, 9C, and 9D are collectively referred to as FIG. 9.

As previously mentioned, the first cam profile 80 and the second cam profile 85 are adapted to engage each other in a manner that facilitates asymmetric changes in elevation of the respective first and second pedals 25 and 30 in response to pedal depression. When the first pedal 25 and second pedal 30 are at neutral positions 325a such as shown in FIG. 9, the first cam upper profile 90 of the first cam 40 engages the second cam upper profile 100 of the second cam 50, and the first cam lower profile 95 of the first cam 40 engages the second cam lower profile 105 of the second cam 50. A spring plate mechanism 300 shown in FIGS. 1 and 10 can be employed to bias the first and second pedals 25 and 30 to be in a level neutral throttle position 325.

With reference again to FIGS. 1-8, when the first pedal 25 (such as a forward pedal) is moved in a first pedal first direction (such as downward) indicated by arrow 200, the first cam upper profile 90 of the first cam 40 and the second cam upper profile 100 of the second cam 50 move into further engagement such that movement (such as rotation) of the first cam 40 about the first pivot pin 45 causes the second cam 50 to move (such as rotate) about the second pivot pin 55 via the further engagement of the first cam upper profile 90 of the first cam 40 with the second cam upper profile 100 of the second cam 50. Further engagement of the first cam upper profile 90 with the second cam upper profile 100 may include greater surface area contact between the first cam upper profile 90 and the second cam upper profile 100. Alternatively or additionally, the further engagement may include greater interweaving, insertion, and/or contact between the second cam upper profile peak 155 with the first cam upper trough 115. As a result of the first pedal 25 being moved in the first pedal first direction 200, the second pedal 30 is moved in a second pedal second direction indicated by arrow 201 (FIG. 2A).

While the first cam upper profile 90 and the second cam upper profile 100 increase engagement in response to depression of the first pedal 25, the first cam lower profile 95 of the first cam 40 and the second cam lower profile 105 of the second cam 50 decrease or move out of engagement. The height and shape differences between the interacting first cam lower profile peak 120 and second cam lower profile peak 165 permit these peaks to disengage earlier than would peaks (teeth) of interacting typical independently symmetrical cams. Without such engagement between the first cam lower profile 95 of the first cam 40 and the second cam lower profile 105 of the second cam 50, the movement (such as rotation) of the first lower cam profile 95 in response to movement of the first cam 40 about the first pivot pin 45 does not contribute to movement (such as rotation) of the second cam 50 about the second pivot pin 55 via the second cam lower profile 105. FIGS. 1-4 show exemplary progression of engagement/disengagement of the first cam profile 80 of the first cam 40 with the second cam profile 85 of the second cam 50 through different (depression) positions 15a, 15b, 15c, and 15d of depression of the first pedal 25 with respective elevation positions 205a, 205b, 205c, 205d (collectively second-pedal-up position(s) 205) of the second pedal 30.

In response to depression of the first pedal 25, the angular displacement of the first pedal 25 and of the first cam 40 in the direction of arrow 200 can be the same or it can be different. However, a rigid connection between the first pedal 25, the first pedal arm 60, and the first cam 40 permits simple implementation of the same direction of angular displacement. On the other hand, because rotational movement is imparted, in response to depression of the first pedal 25, to the second cam 50 via the engagement of the first cam upper profile 90 of the first cam 40 with the second cam upper profile 100 of the second cam 50, and not via the engagement of the first cam lower profile 95 of the first cam 40 with the second cam lower profile 105 of the second cam 50, the angular displacement of the second cam 50 is in a rotational direction opposite to the angular displacement of the first cam 40, and is of a lesser magnitude. Accordingly, in response to depression of the first pedal 25, the second pedal 30 is moved in a direction of angular displacement that is approximately opposite to that of the direction of angular displacement of the first pedal 25 (approximately opposite to the direction indicated by arrow 200), but the magnitude of movement is less. A rigid connection between the second pedal 30, the second pedal arm 65, and the second cam 50 permits simple implementation of this responsive opposite direction of angular displacement of the second pedal 30 with respect to that of the first pedal 25.

Moreover, the height and shape differences between the interacting first cam upper profile peak 110 and the second cam upper profile peak 155 in cooperation with the disengagement between the first cam lower profile peak 120 and the second cam lower profile peak 165 permit the magnitude displacement of the first and second pedals 25 and 30 from the neutral positions 325a to be different in response to depression of the first pedal 25. In particular, the different height of the first cam upper profile peak 110 and the second cam upper profile peak 155 create different distance lever arms from their respective first and second pins 45 and 55. By having a shorter peak distance to the rotational pin for the downward moving pedal and a longer peak distance for the upward moving pedal, this arrangement allows the travel of the pedal moving downward to be moved further than the pedal moving upward. Each cam profile may be defined to work in a similar fashion as a gear, where it engages and allows for movement through a specific rotational range and then disengages as the other cam engages to allow the other cam to control the movement. More particularly, one or more points in the vicinity of the first cam upper profile peak 110 (such as at or near the first cam upper profile peak 110) have respective first cam shorter distances to the first pin 45 (or to the center of the first pin 45), and one or more points in the vicinity of the first cam lower profile peak 120 (such as at or near the first cam lower profile peak 120) have respective first cam longer distances to the first pin 45 (or to the center of the first pin 45). Because the first cam upper profile peak 110 is adapted to guide downward movement of the first pedal 25 and the first cam lower profile peak 120 is adapted to guide upward movement of the first pedal 25, this relationship facilitates greater downward movement of the first pedal 25 than upward movement of the second pedal 30 in response to depression of the first pedal 25.

Figure 10A:
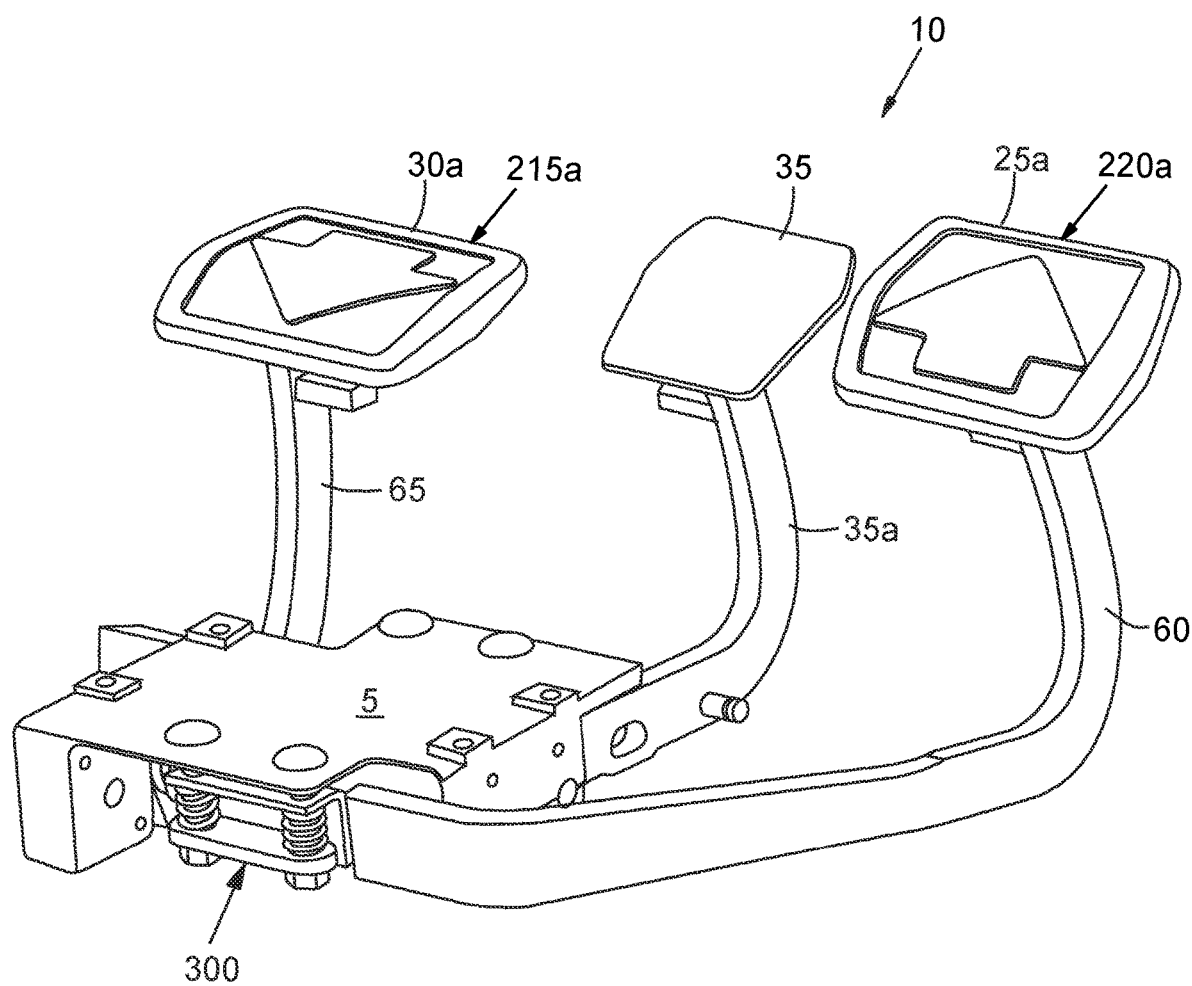
FIG. 10A is a front and right-side isometric drawing of a pedal assembly in a slightly depressed left-pedal-down position, according to one embodiment.
Figure 10B:
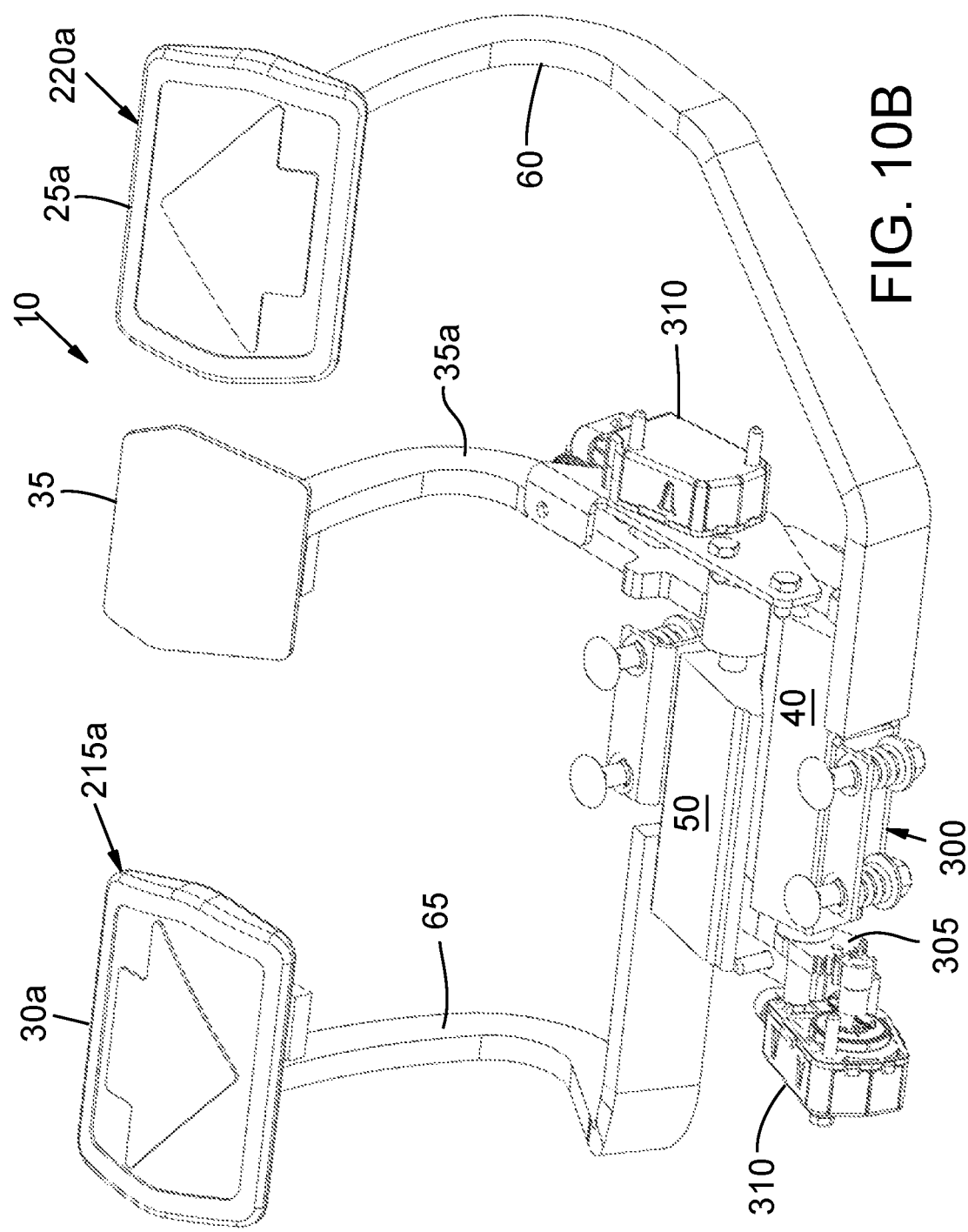
FIG. 10B is a front and right-side isometric drawing of a pedal assembly of FIG. 10A shown without the cover frame to expose the pedal control mechanism.
Figure 10C:
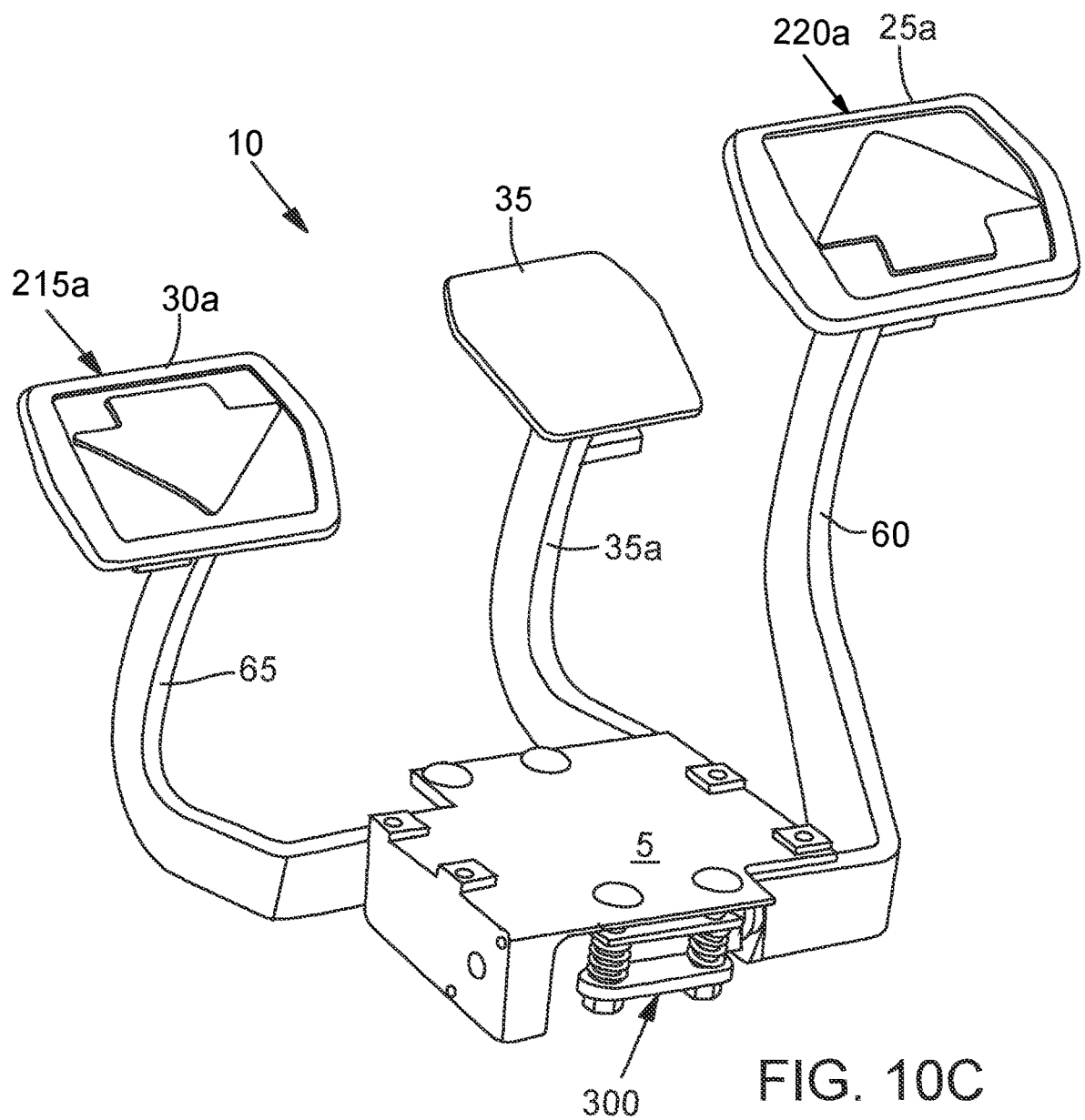
FIG. 10C is a front and left-side isometric drawing of the pedal assembly of FIG. 10A in a slightly depressed left-pedal-down position.
Figure 11A:
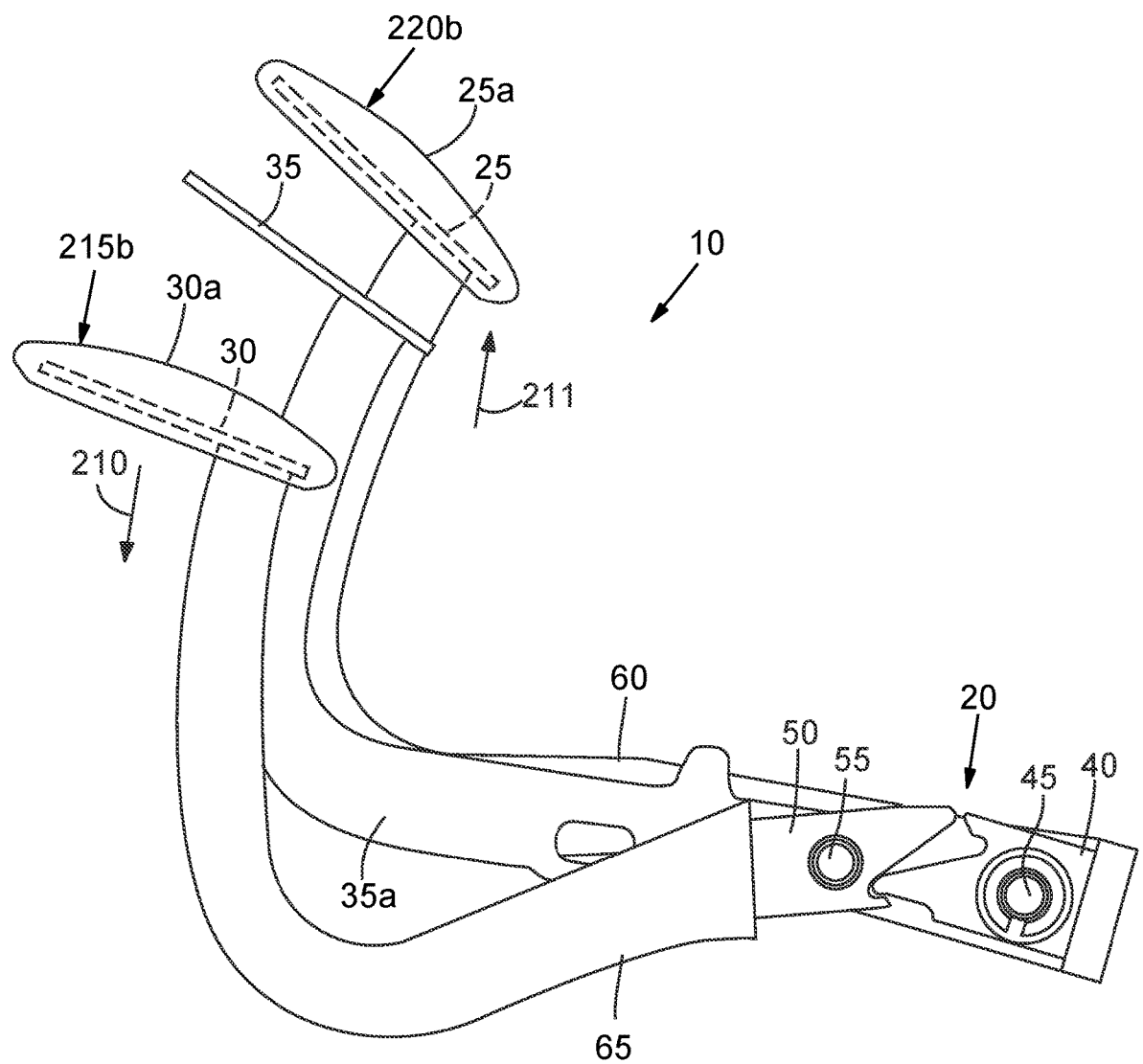
FIG. 11A is a left-side view of the pedal assembly of FIG. 10A in a more depressed, left-pedal-down position.
Figure 11B:
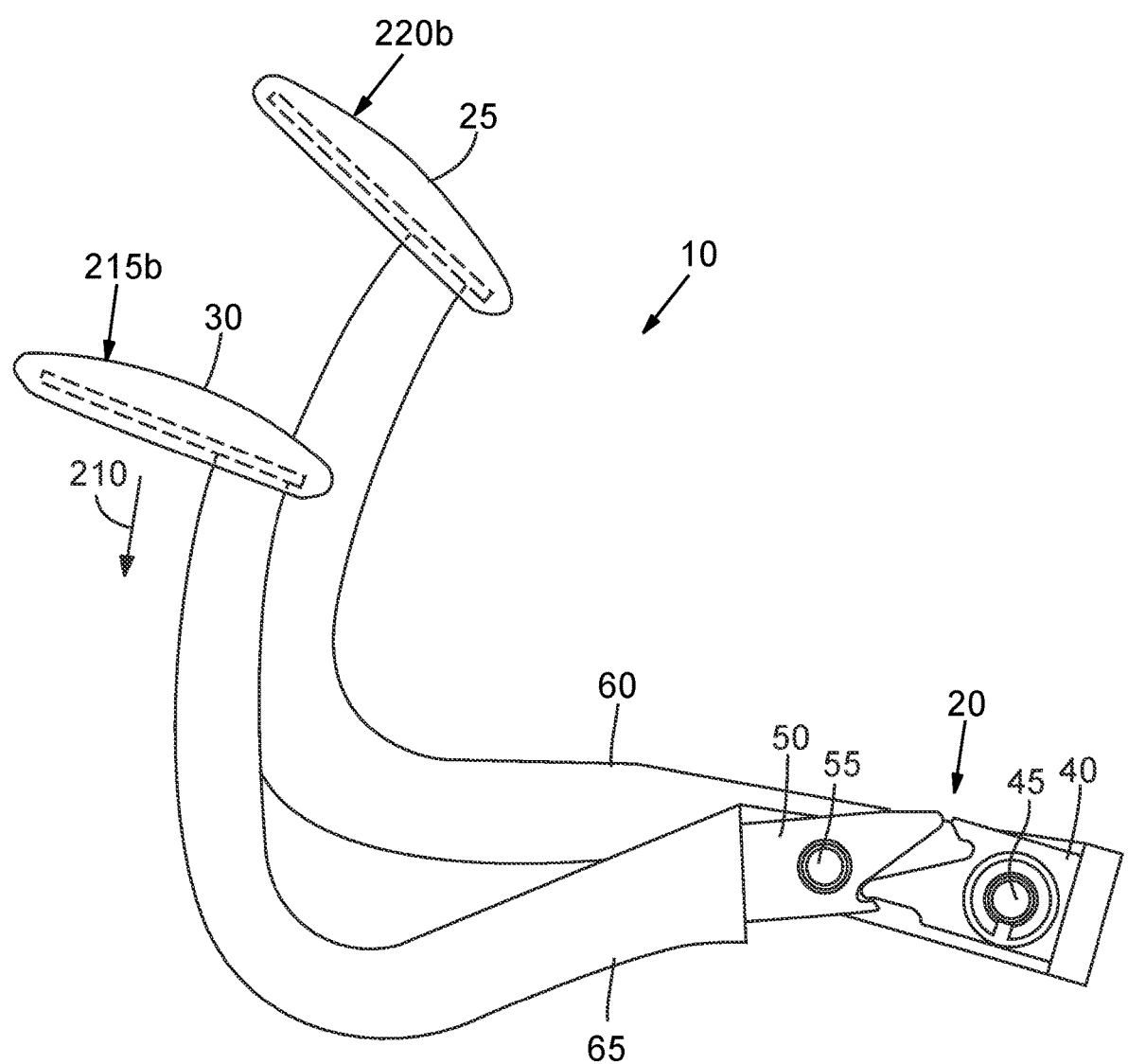
FIG. 11B is a left-side view of the pedal assembly of FIG. 10A in a more depressed, left-pedal-down position, shown without the brake pedal for greater clarity.
Figure 12A:
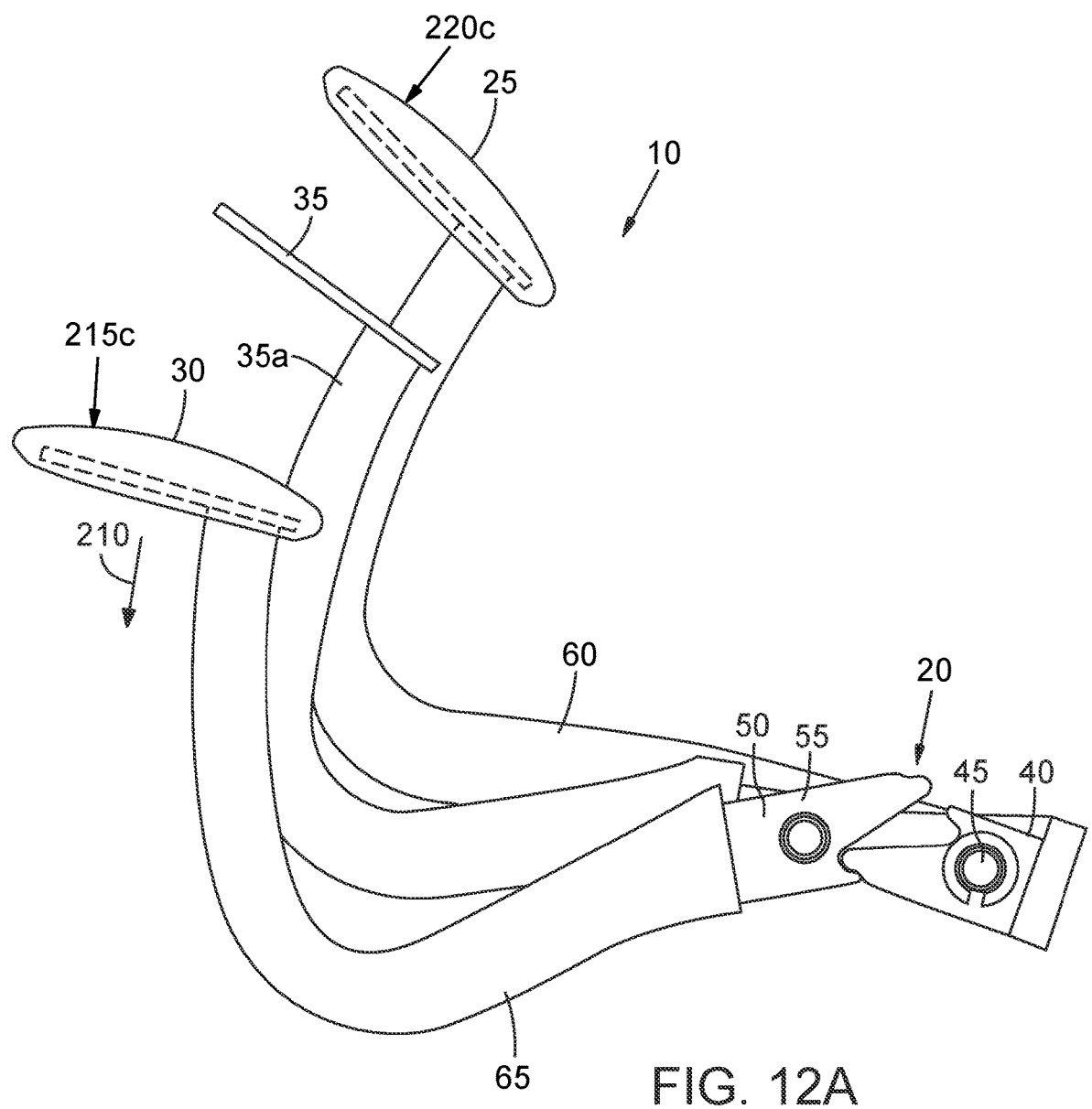
FIG. 12A is a left-side view of the pedal assembly of FIG. 10A in a more depressed, left-pedal-down position.
Figure 12B:
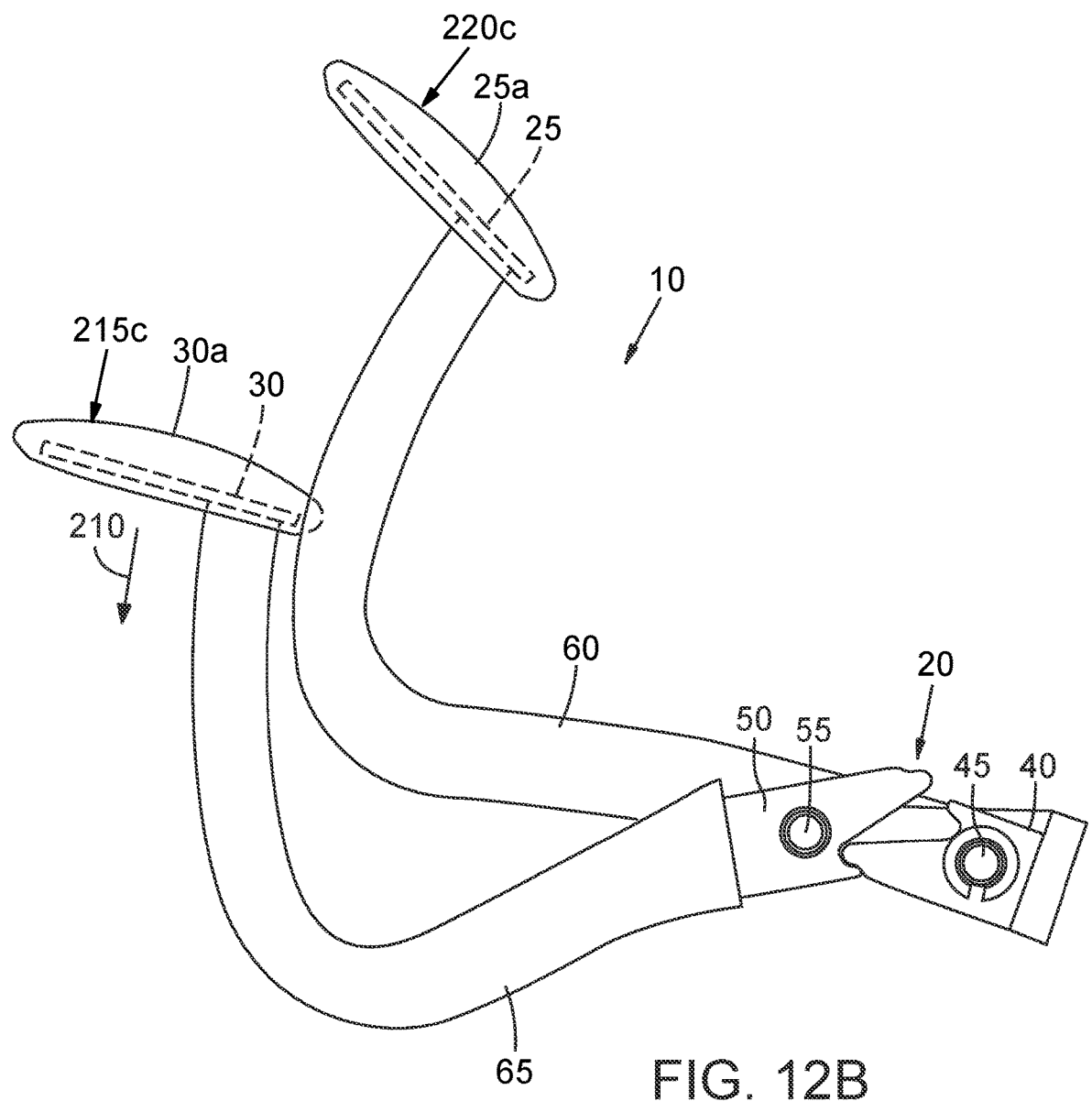
FIG. 12B is a left-side view of the pedal assembly of FIG. 10A in a more depressed, left-pedal-down position, shown without the brake pedal for greater clarity.

FIG. 10A is a front and right-side isometric drawing of the pedal assembly 10 in a slightly depressed left-pedal-down position 215a; FIG. 10B is a front and right-side isometric drawing of a pedal assembly 10 of FIG. 10A shown without the cover frame 5 to expose the pedal control mechanism 20; FIG. 10C is a front and left-side isometric drawing of the pedal assembly 10 in a slightly depressed left-pedal-down position 215a; FIG. 11A is a left-side view of the pedal assembly 10 of FIG. 10A in a more depressed, left-pedal-down position 215b; FIG. 11B is a left-side view of the pedal assembly 10 of FIG. 10A in a more depressed, left-pedal-down position 215b, shown without the brake pedal 35 for greater clarity; FIG. 12A is a left-side view of the pedal assembly 10 of FIG. 10A in a more depressed, left-pedal-down position 215c, according to one embodiment; and FIG. 12B is a left-side view of the pedal assembly 10 of FIG. 10A in a more depressed, left-pedal-down position 215c, shown without the brake pedal 35 for greater clarity. FIGS. 10A, 10B, and 10C are collectively FIG. 10; FIGS. 11A and 11B are collectively FIG. 11; and FIGS. 12A and 12B are collectively FIG. 12. Left-pedal-down positions 215a, 215b, and 215c are collectively left-pedal-down position(s) 215.

With reference to FIGS. 7-12, when the second pedal 30 (such as a reverse pedal) is moved in a second pedal first direction (such as downward) indicated by arrow 210, the second cam lower profile 105 of the second cam 50 and the first cam lower profile 95 of the first cam 40 move into further engagement such that movement (such as rotation) of the second cam 50 about the second pivot pin 55 causes the first cam 40 to move (such as rotate) about the first pivot pin 45 via the further engagement of the second cam lower profile 105 of the second cam 50 with the first cam lower profile 95 of the first cam 40. Further engagement of the second cam lower profile 105 with the first cam lower profile 95 may include greater surface area contact between the second cam lower profile 105 and the first cam lower profile 95. Alternatively or additionally, the further engagement may include greater interweaving, insertion, and/or contact between the second cam lower trough 170 and the first cam lower profile peak 120. As a result of the second pedal 30 being moved in the second pedal first direction 210, the first pedal 25 is moved in a first pedal second direction indicated by arrow 211 (FIG. 11A).

While the second cam lower profile 105 and the first cam lower profile 95 increase engagement in response to depression of the second pedal 30, the second cam upper profile 100 of the second cam 50 and the first cam upper profile 90 of the first cam 40 decrease or move out of engagement. The height and shape differences between the interacting second cam upper profile peak 155 and first cam upper profile peak 110 permit these peaks to disengage earlier than would peaks (teeth) of interacting typical independently symmetrical cams. Without engagement between the second cam upper profile 100 of the second cam 50 and the first cam upper profile 90 of the first cam 40, the movement (such as rotation) of the second upper cam profile 100 in response to movement of the second cam 50 about the second pivot pin 55 does not contribute to movement (such as rotation) of the first cam 40 about the first pivot pin 45 via the first cam upper profile 90. FIGS. 10-12 show exemplary progression of engagement/disengagement of the second cam profile 85 of the second cam 50 with the first cam profile 80 of the first cam 40 through different (depression) positions 215a, 215b, and 215c of depression of the second pedal 30 with respective elevation positions 220a, 220b, and 220c (collectively first-pedal-up position(s) 220) of the first pedal 25.

In response to depression of the second pedal 30, the angular displacement of the second pedal 30 and of the second cam 50 in the direction of arrow 210 can be the same or it can be different. However, a rigid connection between the second pedal 30, the second pedal arm 65, and the second cam 50 permits simple implementation of the same direction of angular displacement. On the other hand, because rotational movement is imparted, in response to depression of the second pedal 30, to the first cam 40 via the engagement of the second cam lower profile 105 of the second cam 50 with the first cam lower profile 95 of the first cam 40, and not via the engagement of the second cam upper profile 100 of the second cam 50 with the first cam upper profile 90 of the first cam 40, the angular displacement of the first cam 40 is in a rotational direction opposite to the angular displacement of the second cam 50, and is of a lesser magnitude. Accordingly, in response to depression of the second pedal 30, the first pedal 25 is moved in a direction of angular displacement that is approximately opposite to that of the direction of angular displacement of the second pedal 30 (approximately opposite to the direction indicated by arrow 210), but the magnitude of movement is less. A rigid connection between the first pedal 25, the first pedal arm 60, and the first cam 40 permits simple implementation of this responsive opposite direction of angular displacement of the first pedal 25 with respect to that of the second pedal 30.

Moreover, the height and shape differences between the interacting second cam lower profile peak 165 and the first cam lower profile peak 120 in cooperation with the disengagement between the second cam upper profile peak 155 and the first cam upper profile peak 110 permit the magnitude displacement of the second and first pedals 30 and 25 from the neutral positions 325a to be different in response to depression of the second pedal 30.

More particularly, one or more points in the vicinity of the second cam lower profile peak 165 (such as at or near the second cam lower profile peak 165) have respective second cam shorter distances to the second pin 55 (or to the center of the second pin 55), and one or more points in the vicinity of the second cam upper profile peak 155 (such as at or near the second cam upper profile peak 155) have respective second cam longer distances to the second pin 55 (or to the center of the second pin 55). Because the second cam lower profile peak 165 is adapted to guide downward movement of the second pedal 30 and the second cam upper profile peak 155 is adapted to guide upward movement of the second pedal 30, this relationship facilitates greater downward movement of the second pedal 30 than upward movement of the first pedal 25 in response to depression of the second pedal 30.

Alternatively stated, one or more points in the vicinity of the first cam upper profile peak 110 (such as at or near the first cam upper profile peak 110) that contact the second cam upper profile 100 have respective first cam shorter distances to the first pin 45 (or to the center of the first pin 45), and one or more points in the vicinity of the second cam upper profile peak 155 (such as at or near the second cam upper profile peak 155) have respective second cam longer distances to the second pin 55 (or to the center of the second pin 55), wherein the second cam longer distances are longer than the first cam shorter distances. This relationship facilitates greater downward movement of the first pedal 25 than upward movement of the second pedal 30 in response to depression of the first pedal 25.

Similarly, one or more points in the vicinity of the second cam lower profile peak 165 (such as at or near the second cam lower profile peak 165) have respective second cam shorter distances to the second pin 55 (or to the center of the second pin 55), and one or more points in the vicinity of the first cam lower profile peak 120 (such as at or near the first cam lower profile peak 120) have respective first cam longer distances to the first pin 45 (or to the center of the first pin 45), wherein the second cam shorter distances are shorter than the first cam longer distances. This relationship facilitates greater downward movement of the second pedal 30 than upward movement of the first pedal 25 in response to depression of the second pedal 30.

Figure 13:
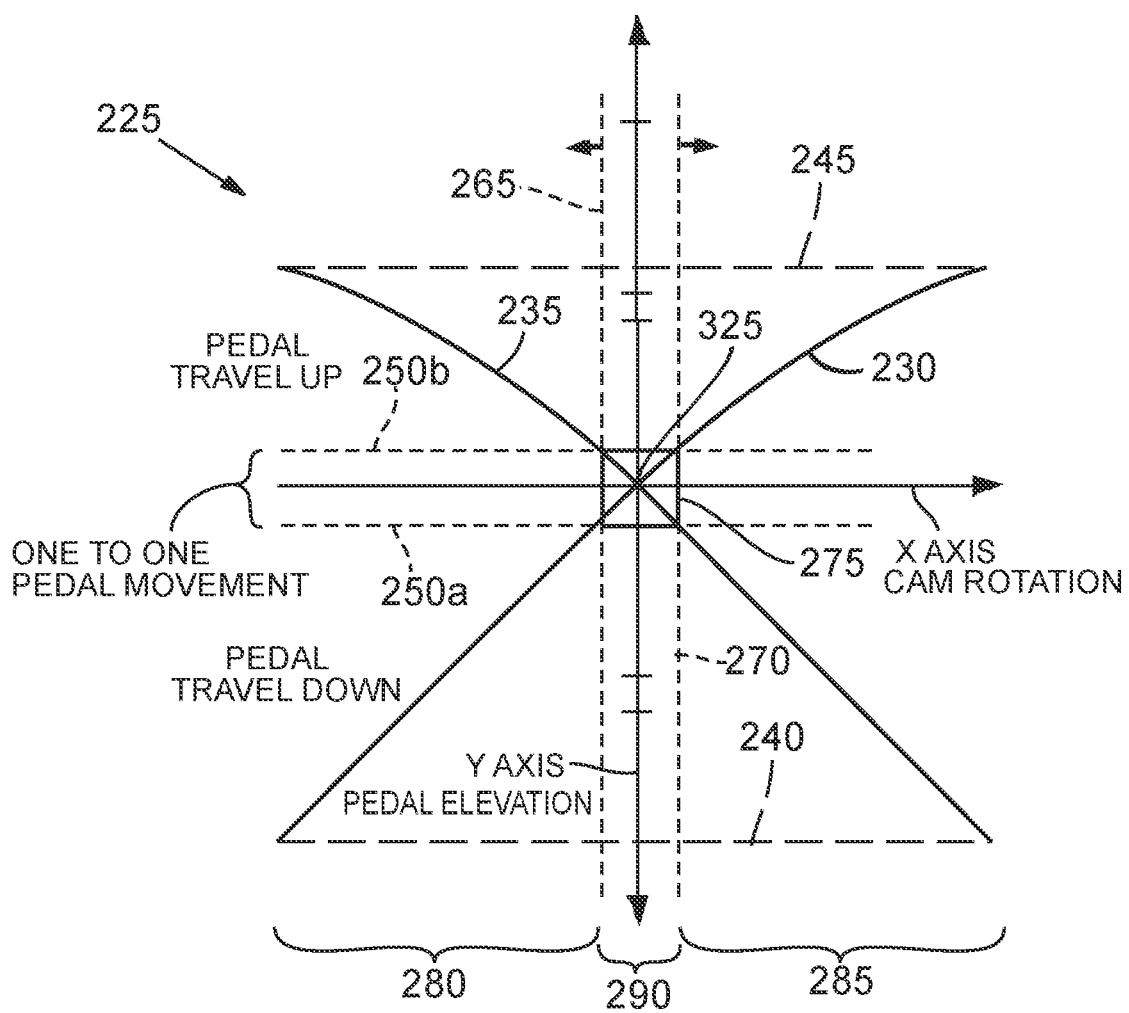
FIG. 13 is a graph showing an example of relative correlated pedal displacement.

FIG. 13 is a graph 225 showing an example of relative correlated pedal displacement versus angular cam rotation as indicated by a first pedal curve 230 and a second pedal curve 235. With reference to FIG. 13, an X-axis indicates angular movement (in degrees) of the first and second cams 40 and 50 relative to elevation displacement of the first and second pedals 25 and 30 indicated by the Y-axis. For convenience, the X-axis is shown at a position that indicates the first pedal 25 and the second pedal 30 are at the same height, and Y-axis is shown in a position that indicates that the first cam 40 and the second cam 50 are in a relative neutral throttle position 325, such as shown in FIG. 9A and at the intersection of the X-axis and Y-axis in FIG. 13. Depression of the first pedal 25 with correlated lift of the second pedal 30 is shown to the left of the Y-axis, and depression of the second pedal 30 with correlated lift of the first pedal 25 is shown to the right of the Y-axis. A depth line 240 indicates an example of a possible maximum depth of depression for each of the first pedal 25 and the second pedal 30, and a height line 245 indicates an example of a possible maximum height for each of the first pedal 25 and the second pedal 30. One will appreciate that the first pedal 25 and the second pedal 30 can have the same maximum depths and heights or they can have different maximum depths and heights.

During depression of the first pedal 25 (from the X-axis) toward a mathematically and/or ergonomically selected depression level indicated by an intermediate depression line 250a along the first pedal displacement curve 230, both of the first cam upper and lower profiles 90 and 95 may maintain contact with their respectively mated second cam upper and lower profiles 100 and 105 so that the second pedal 30 is equally displaced upward (toward an intermediate height line 250b) as the first pedal 25 is displaced downward. As depression of the first pedal 25 continues along the first pedal displacement curve 230 beyond the intermediate depression line 250a, the first cam lower profile 95 disengages from the second cam lower profile 105 (as indicated by the first pedal upper profile-only engagement line 265) so that only the contact between the first cam upper profile 90 and the second cam upper profile 100 drives the displacement of the second pedal 30 such that displacement upward of the second pedal 30 occurs at a slower rate, as indicated by the second pedal curve 235, than does the downward displacement of the first pedal 25 as indicated by the first pedal curve 230.

During depression of the second pedal 30 (from the X-axis) toward the mathematically and/or ergonomically selected depression level indicated by an intermediate depression line 250a along the second pedal displacement curve 235, both of the second cam upper and lower profiles 100 and 105 may maintain contact with their respectively mated first cam upper and lower profiles 90 and 95 so that the first pedal 25 is equally displaced upward (toward the intermediate height line 250b) as the second pedal 30 is displaced downward. As depression of the second pedal 30 continues along the second pedal displacement curve 235 beyond the intermediate depression line 250a, the second cam upper profile 100 disengages from the first cam upper profile 90 (as indicated by the second pedal lower profile-only engagement line 270) so that only the contact between the second cam lower profile 105 and the first cam lower profile 95 drives the displacement of the first pedal 25 such that displacement upward of the first pedal 25 occurs at a slower rate, as indicated by the first pedal curve 230, than does the downward displacement of the second pedal 30, as indicated by the second pedal curve 235. One will appreciate that the first pedal displacement curve 230 and the second pedal displacement curve 235 can be symmetrical, but they can be asymmetrical having different downward slopes and/or different upward curvatures. Similarly, the intermediate depression line 250a and/or the intermediate height line 250b can be at the same or different levels on each side of the X-axis.

With reference again to FIG. 13, an equal displacement range 275, depicted as a rectangle in the graph 225, shows a range of one-to-one pedal displacement where both the upper and lower profiles of both the first and second cams 40 and 50 are engaged. Thus, to smooth transition from forward to reverse (or reverse to forward) and to avoid lockup, some portion of the first cam profile 80 is already engaged with some portion of the second cam profile 85 before their respective other portions disengage, whereas instantaneous engagement and disengagement might cause a rough transition from forward to reverse (or reverse to forward) or lockup. One will also appreciate that upward portions of the first pedal displacement curve 230 and the second pedal displacement curve 235 transition out of the linear portions emanating from the equal displacement range 275 to reduce the upward travel of the first and second pedals 25 and 30 without a step.

The graph 225 also shows ratios 280, 285, 290 of cam angular displacement to pedal elevational movement. The ratio 280 is associated with depression of the first pedal 25 and lift of the second pedal 30; the ratio 285 is associated with depression of the second pedal 30 and lift of the first pedal 25; and the ratio 290 is associated with angular displacement of the cams in an equal elevational displacement range 275. These ratios may be different due to the space between the first and second cam pins 45 and 55 (and the different effective distances of the first and second cam arms 60 and 65). In this regard, the equal elevation displacement range 275 may be different on each side of the Y-axis such that the lines 265 and 270 are different distances from the Y-axis. These factors may drive the different designs for the first and second cam profiles 80 and 85.

As noted previously, the pedal control mechanism 20 may operatively communicate with a throttle mechanism or other drive source controller (not shown) to control the amount of power that is operatively delivered to the drive wheel(s). This communication may employ mechanical linkages (such as gears and/or rods), by electrical or electronic signals, or by a combination of both mechanical and electrical means. In the embodiments shown in FIGS. 1B, 9B, 9C, 9D, and 10B, the gears 305 are operatively connected to rotary encoders 310 to convert the mechanical movement of the first and second pedals 25 and 30 into electrical or electronic signals that are conveyed directly or indirectly to the throttle mechanism or other drive source controller to control the amount of power that is operatively delivered to the drive wheel(s). Such signals may be conveyed by a hardwired or wireless system. In some embodiments, the rotary encoder(s) 310 provide one or more electronic position signals that are sent to a vehicle system manager (VSM), such as a computer that operates the vehicle). The position signals may indicate the rotational position of each pedal (forward and reverse). Based on these position signals, the VSM commands the engine and transmission to move the vehicle in both direction and magnitude. An electronic signal that may also be sent to the VSM in response to depression of the middle auxiliary pedal 35 to indicates an amount of service braking to apply.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A method for imparting asymmetric movement to associated first and second pedals adapted for operative connection to a drive wheel of a vehicle, the method involving a first cam having a first cam profile having a first cam upper profile and a first cam lower profile that are different, the method also involving a second cam having a second cam profile having a second cam upper profile and a second cam lower profile that are different, the method comprising:

in response to downward movement of the first pedal:
moving a first cam about a first rotational axis, thereby causing rotation of the first upper cam profile about the first rotational axis;
during rotation of the first upper cam profile about the first rotational axis in a first cam first rotational direction, contacting one or more first cam upper points with one or more second cam upper points; and
causing, as a result of the contacting, the second cam to rotate to a lesser amount about the second rotational axis in a second cam second rotational direction that is opposite to the first cam first rotational direction; and in response to downward movement of the second pedal:
moving a second cam about a second rotational axis, thereby causing rotation of the second lower cam profile about the second rotational axis;
during rotation of the second lower cam profile about the second rotational axis in a second cam first rotational direction, contacting one or more second cam lower points with one or more first cam lower points; and
causing, as a result of the contacting, the first cam to rotate to a lesser amount about the first rotational axis in a first cam second rotational direction that is opposite to the second cam first rotational direction.

2. The method of claim 1, wherein the first cam upper profile and the first cam lower profile are asymmetric and wherein the second cam upper profile and the second cam lower profile are asymmetric.

3. The method of claim 1, wherein the first cam profile and the second cam profile are different from each other regardless of orientation.

4. The method of claim 1, wherein the first cam upper profile comprises a first cam upper profile peak and a first cam upper trough, wherein the first cam lower profile comprises a first cam lower profile peak, and wherein the first cam upper profile peak is shorter than the first cam lower profile peak.

5. The method of claim of 4, wherein the first cam upper profile peak is adapted to guide downward movement of the first pedal in response to downward movement of the first pedal, wherein the first cam lower profile peak is adapted to guide upward movement of the first pedal in response to downward movement of the second pedal.

6. The method of claim 4, wherein the first cam lower profile comprises a first cam lower trough, and wherein the first cam upper trough is deeper than the first cam lower trough with respect to the first cam lower profile peak.

7. The method of claim 4, wherein the second cam upper profile comprises a second cam upper profile peak, wherein the second cam lower profile comprises a second cam lower profile peak and a second cam lower trough, and wherein the second cam upper profile peak is taller than the second cam lower profile peak.

8. The method of claim 7, wherein the second cam lower profile comprises a second cam upper trough, and wherein the second cam upper trough is shallower than the second cam lower trough with respect to the second cam upper profile peak.

9. The method of claim 1, wherein the first cam is further configured for movement about a first cam pin, the second cam is further configured for movement about a second cam pin, and depression of the first or second pedals maintains a specified distance between the first cam pin and the second cam pin.

10. The method of claim 9, wherein movement of the first cam about the first cam pin is rotational and movement of the second cam about the second cam pin is rotational.

11. The method of claim 1, wherein movement of the first pedal in the first pedal first direction is associated with movement of the vehicle in a forward direction, and wherein movement of the second pedal in the second pedal first direction is associated with movement of the vehicle in a backward direction.

12. The method of claim 1, wherein a pedal arm is connected between the first pedal and the first cam.

13. The method of claim 1, wherein the first pedal and the second pedal are adapted to be at a neutral position when the first cam upper profile engages the second cam upper profile and the first cam lower profile engages the second cam lower profile.

14. The method of claim 1, wherein the first pedal and the first cam are operatively rigidly connected and the second pedal and second cam are operatively rigidly connected.

15. The method of claim 1, wherein the first cam upper profile comprises a first cam shorter peak with a first shorter distance to a first rotational pin, wherein the first cam lower profile comprises a first cam longer peak with a first longer distance to the first rotational pin, wherein the first cam shorter peak is adapted to guide downward movement of the first pedal, wherein the first cam longer peak is adapted to guide upward movement of the first pedal, wherein the second cam upper profile comprises a second cam longer peak with a second longer distance to a second rotational pin, wherein the second cam lower profile comprises a second cam shorter peak with a second shorter distance to the second rotational pin, wherein the second cam shorter peak is adapted to guide downward movement of the second pedal, and wherein the second cam longer peak is adapted to guide upward movement of the second pedal to facilitate greater downward movement of the first pedal than upward movement of the second pedal in response to depression of the first pedal and to facilitate greater downward movement of the second pedal than upward movement of the first pedal in response to depression of the second pedal.

16. The method of claim 1, wherein, in response to movement of the first pedal in the first pedal first direction, rotational movement is imparted from the first cam to the second cam via the engagement of the first cam upper profile with the second cam upper profile without engagement of the first cam lower profile with the second cam lower profile, wherein angular displacement of the second cam is in a rotational direction opposite to angular displacement of the first cam, wherein angular displacement of the second cam is of a lesser magnitude than the angular displacement of the first cam in response to movement of the first pedal in the first pedal first direction, wherein the second pedal is moved in the second pedal second direction that is substantially opposite to the first pedal first direction, and wherein movement of the second pedal in the second pedal second direction is of a lesser magnitude than movement of the first pedal in the first pedal direction.

17. The method of claim 1, wherein the second pedal second direction is substantially opposite to the first pedal first direction.

18. The method of claim 1, wherein the second pedal second direction is substantially opposite to the first pedal first direction, wherein connection between the first pedal and the first cam is substantially rigid, wherein connection between the second pedal and the second cam is substantially rigid, wherein movement of the first cam about a first pin is rotational, wherein movement of the second cam about a second pin is rotational, wherein the first cam upper profile comprises a first cam upper profile peak and a first cam upper trough, wherein the first cam lower profile comprises a first cam lower profile peak, wherein the first cam upper profile peak is shorter than the first cam lower profile peak, wherein the second cam upper profile comprises a second cam upper profile peak, wherein the second cam lower profile comprises a second cam lower profile peak and a second cam lower trough, wherein the second cam upper profile peak is taller than the second cam lower profile peak, and wherein, in response to movement of the first pedal in the first pedal first direction, angular displacement of the second cam is in a rotational direction opposite to angular displacement of the first cam and angular displacement of the second cam is of a lesser magnitude than the angular displacement of the first cam.

19. The method of claim 1, wherein the vehicle is a material-handling vehicle.

20. The method of claim 1, wherein the movement of the second pedal in the second pedal second direction is a predetermined fraction of the movement of the first pedal in the first pedal first direction.

21. The method of claim 1, wherein the first cam upper profile comprises a first cam upper profile peak, wherein the first cam lower profile comprises a first cam lower profile peak, wherein the second cam upper profile comprises a second cam upper profile peak, wherein the second cam lower profile comprises a second cam lower profile peak, and wherein the first cam upper profile peak is different from the first cam lower profile peak, the second cam upper profile peak, and the second cam lower profile peak.

22. The method of claim 1, wherein during initial depression of the first pedal toward a mathematically or ergonomically selected depression level, both of the first cam upper and lower profiles maintain contact with their respectively mated second cam upper and lower profiles so that the second pedal is equally displaced upward as the first pedal is displaced downward, and wherein as depression of the first pedal continues beyond the selected depression level, the first cam lower profile disengages from the second cam lower profile so that only the contact between the first cam upper profile and the second cam upper profile drives the displacement of the second pedal such that displacement upward of the second pedal occurs at a slower rate than does the downward displacement of the first pedal.

23. The method of claim 1, wherein first cam angular displacement to first pedal elevational movement between a first maximum height elevation and a first maximum depth elevation can be expressed as a first ratio along a first pedal ratio curve, wherein second cam angular displacement to second pedal elevational movement between a second maximum depth elevation and a second maximum height elevation can be expressed as a second ratio along a first pedal ratio curve, wherein a first total length along the first and second pedal ratio curves in which the first ratio and second ratios are equal is smaller than a second total length along the first and second pedal ratio curves in which the first ratio and second ratios are different.

24. A method for moving, a vehicle having a drive source, the method comprising:
- powering the drive source; and
- pressing, in a first pedal first direction, a first pedal operatively connected indirectly to the drive source for causing movement of the vehicle in first vehicle direction in response to pressing the first pedal in the first pedal first direction, wherein:
  - the first pedal is directly or indirectly operatively connected to a first cam in a manner such that movement of the first pedal in the first pedal first direction causes movement of the first cam about a first pin in a first cam first direction and such that movement of the first cam in a first cam second direction causes movement of the first pedal in a first pedal second direction that is opposite to the first pedal first direction;
  - the first cam has a first cam profile having a first cam upper profile and a first cam lower profile that are different;
  - movement of the first cam about the first pin causes movement of a second cam about a second pin in second cam second direction that is opposite to the first cam first direction;
  - the second cam is operatively directly or indirectly connected to a second pedal that is operatively connected indirectly to the drive source for causing movement of the vehicle in a second vehicle direction that is opposite to the first vehicle direction in response to pressing the second pedal in the second pedal first direction such that movement of the second pedal in the second pedal first direction causes movement of the second cam about the second pin in a second cam first direction and such that movement of the second cam in a second cam second direction causes movement of the second pedal in a second pedal second direction that is opposite to the second pedal first direction;
  - the second cam has a second cam profile having a second cam upper profile and a second cam lower profile that are different; and
  - there is a cam proximity between the first cam and the second cam, such that:
  movement of the first pedal in the first pedal first direction causes the first cam upper profile to move about the first pin and engage with the second cam upper profile and cause it to move about the second pin to cause movement of the second pedal in the second pedal second direction, and movement of the first pedal in the first pedal first direction causes the first cam lower profile to disengage with the second cam lower profile associated with the second pedal, such that movement of the first pedal in the first pedal first direction is greater than the movement of the second pedal in the second pedal second direction; and movement of the second pedal in the second pedal first direction causes the second cam lower profile to move about the second pin and engage with the first cam lower profile and cause it to move about the first pin to cause movement of the first pedal in the first pedal second direction, and movement of the second pedal in the second pedal first direction causes the second cam upper profile to disengage with the first cam upper profile associated with the first pedal, such that movement of the second pedal in the second pedal first direction is greater than the movement of the first pedal in the first pedal second direction.

* * * * *

UNITED STATES PATENT AND TRADEMARK OFFICE
CERTIFICATE OF CORRECTION

PATENT NO. : 11,561,569 B2
APPLICATION NO. : 17/526110
DATED : January 24, 2023
INVENTOR(S) : Anthony Michael Jay It is certified that error appears in the above-identified patent and that said Letters Patent is hereby corrected as shown below:

In the Specification

In Column 18, Lines 14-15, delete "shown on" and insert --shown in-- therefor.

In Column 19, Line 37, delete "shown on" and insert --shown in-- therefor.

In Column 27, Line 22, delete "285, 290" and insert --285, and 290-- therefor.

In Column 27, Line 55, delete "the vehicle)." and insert --the vehicle.-- therefor.

In the Claims

In Column 28, Claim 5, Line 62, delete "claim of 4," and insert --claim 4,-- therefor.

In Column 31, Claim 24, Line 14, delete "moving, a" and insert --moving a-- therefor.

In Column 31, Claim 24, Line 19, delete "in first" and insert --in a first-- therefor.

Signed and Sealed this
Twenty-third Day of January, 2024

Katherine Kelly Vidal
*Director of the United States Patent and Trademark Office*